(12) United States Patent
White et al.

(10) Patent No.: US 7,850,763 B2
(45) Date of Patent: Dec. 14, 2010

(54) PURIFICATION OF CARBON DIOXIDE

(75) Inventors: Vincent White, Epsom (GB); Rodney John Allam, Chippenham (GB)

(73) Assignee: Air Products and Chemicals, Inc., Allentown, PA (US)

( * ) Notice: Subject to any disclaimer, the term of this patent is extended or adjusted under 35 U.S.C. 154(b) by 881 days.

(21) Appl. No.: 11/656,922

(22) Filed: Jan. 23, 2007

(65) Prior Publication Data

US 2008/0173585 A1    Jul. 24, 2008

(51) Int. Cl.
*B01D 53/14* (2006.01)
(52) U.S. Cl. ............................. 95/174; 95/183; 95/192; 95/194; 95/208; 95/209; 95/227; 95/228; 95/236; 62/617; 62/606; 62/928
(58) Field of Classification Search ................ 210/194, 210/198.2, 656; 95/94, 117, 174, 183, 192, 95/194, 208, 209, 227, 228, 236; 62/18, 62/28, 617, 606, 928
See application file for complete search history.

(56) References Cited

U.S. PATENT DOCUMENTS

| | | | |
|---|---|---|---|
| 3,469,410 A * | 9/1969 | Schramm et al. ............. 62/626 |
| 4,595,404 A * | 6/1986 | Ozero et al. ................. 62/630 |
| 4,602,477 A | 7/1986 | Lucadamo |
| 4,762,543 A * | 8/1988 | Pantermuehl et al. ......... 62/625 |
| 4,952,223 A | 8/1990 | Kirshnamurthy et al. |
| 4,977,745 A | 12/1990 | Heichberger |
| 5,927,103 A | 7/1999 | Howard |
| 5,974,829 A | 11/1999 | Novak et al. |
| 6,035,662 A | 3/2000 | Howard et al. |
| 6,210,467 B1 | 4/2001 | Howard |
| 6,477,859 B2 | 11/2002 | Wong et al. |
| 7,666,251 B2 * | 2/2010 | Shah et al. ................... 95/94 |
| 2002/0059807 A1 * | 5/2002 | Wong et al. ................. 62/617 |
| 2005/0155379 A1 | 7/2005 | Gershtein et al. |

FOREIGN PATENT DOCUMENTS

| | | |
|---|---|---|
| EP | 0 410 845 A1 | 1/1991 |
| EP | 0 965 564 A1 | 12/1999 |
| EP | 0 994 318 A2 | 4/2000 |
| EP | 1 026 463 A1 | 8/2000 |
| EP | 0 964 215 B1 | 9/2004 |

(Continued)

OTHER PUBLICATIONS

Thomas, D.C.; "Carbon Dioxide Capture for Storage in Deep Geologic Formations—Results from the CO2 Capture Project, Capture and Separation of Carbon Dioxide from Combustion Sources"; Elsevier; 2005; vol. 1, pp. 451-475.

(Continued)

*Primary Examiner*—Duane Smith
*Assistant Examiner*—Ives Wu
(74) *Attorney, Agent, or Firm*—Willard Jones, II

(57) ABSTRACT

Impure carbon dioxide ("$CO_2$") comprising a first contaminant selected from the group consisting of oxygen ("$O_2$") and carbon monoxide ("CO") is purified by separating expanded impure carbon dioxide liquid in a mass transfer separation column system. The impure carbon dioxide may be derived from, for example, flue gas from an oxyfuel combustion process or waste gas from a hydrogen ("$H_2$") PSA system.

26 Claims, 3 Drawing Sheets

FOREIGN PATENT DOCUMENTS

| | | |
|---|---|---|
| GB | 2 151 597 A | 7/1985 |
| WO | 03/033428 A1 | 4/2003 |
| WO | 2007/126972 A2 | 11/2007 |

OTHER PUBLICATIONS

U.S. Appl. No. 11/287,640, filed Nov. 28, 2005, Allam, et al.
Allam, et al., "The Oxyfuel Baseline: Revamping Heaters and Boilers to Oxyfiring by Cryogenic Air Separation and Flue Gas Recycle", Carbon Dioxide Capture for Storage in Deep Geologic Formations, Elsevier Ltd., vol. 1, 2005, pp. 451-475.
Allam, et al., "A Study of the Extraction of $CO_2$ From the Flue Gas of a 500 MW Pulverised Coal Fired Boiler", Energy Consers. Mgmt., vol. 33, No. 5-8, 1992, pp. 373-378.
White, et al., "Purification of Oxyfuel-Derived $CO_2$ for Sequestration or EOR", Presented at the $8^{th}$ Greenhouse Gas Control Technologies Conference (GHGT-8), Trondheim, Jun. 2006, pp. 1-6.

* cited by examiner

PURIFICATION OF CARBON DIOXIDE

BACKGROUND OF THE INVENTION

The present invention relates to a method and apparatus for purifying impure liquid carbon dioxide ("$CO_2$") comprising a first contaminant selected from the group consisting of oxygen ("$O_2$") and carbon monoxide ("CO"). The process and apparatus have particular application in the recovery of carbon dioxide from waste carbon dioxide gas, for example flue gas from an oxyfuel combustion process or waste gas from a hydrogen ("$H_2$") pressure swing absorption ("PSA") process.

There is an urgent need to develop new processes for production of electrical energy from fossil fuels, carbonaceous fuels or hydrocarbon fuels with capture of carbon dioxide. The new processes should ideally be more efficient and cost effective than existing processes. Oxyfuel combustion processes are being considered in this context.

In oxyfuel combustion, a fuel is combusted in pure oxygen with optional recycle of cooled flue gas or steam or water to moderate the flame temperature. The elimination of the bulk of the nitrogen from the combustion results in a net flue gas which has a high carbon dioxide concentration following cooling and water condensation.

An oxyfuel combustion process is ideally suited for use in a conventional pulverized coal fired boiler for generation of steam used for electric power production. The use of oxyfuel combustion in a pulverized coal fired boiler results in a net flue gas production which, after cooling and condensation of contained water vapor, typically comprises from about 65 mol % to about 95 mol % carbon dioxide and up to about 5 mol % oxygen with the majority of the remainder being nitrogen and argon. The oxygen, nitrogen and argon are referred to as "contaminant gases".

The bulk of the oxygen in the flue gas originates from the excess oxygen required for complete coal combustion. The remaining oxygen originates from air leaking into the boiler and convection section. The nitrogen and argon in the flue gas originates from the oxygen feed for coal combustion, which would typically have a purity of 90 mol % to 99.6 mol %, and usually 95 mol % to 97 mol %, oxygen, and from air leaking into the boiler and convection section.

Also present in the flue gas are impurities such as acid gases and other impurities derived from the coal and the combustion process. The impurities include sulfur dioxide, sulfur trioxide, hydrogen fluoride, hydrogen chloride, nitric oxide, nitrogen dioxide, mercury, etc. The total amount of these impurities in the flue gas (after washing and drying) depends on the composition of the fuel and the combustion conditions.

The flue gas must be purified before carbon dioxide from the flue gas can be stored in, for example, geological formations. In this connection, water soluble components such as sulfur trioxide, hydrogen chloride and hydrogen fluoride, are usually removed from the flue gas by direct contact with water which not only washes out these components but also cools the flue gas and condenses water vapor. Sulfur dioxide and the oxides of nitrogen may be removed during compression of the carbon dioxide to pipeline pressure as disclosed in U.S. patent application Ser. No. 11/287,640 filed on 28th Nov. 2005, the disclosure of which is incorporated herein by reference. This process also removes any mercury that may be present in the carbon dioxide.

The pipeline pressure of carbon dioxide will usually be from about 100 bar to about 250 bar which is well above the critical pressure of carbon dioxide. The bulk of the contaminant gases is preferably removed to reduce the power required to compress the carbon dioxide and to ensure that two phase flow conditions do not arise in the pipeline or in the geological formation in which the carbon dioxide is to be stored.

The presence of oxygen may present problems when the carbon dioxide is intended for use in enhanced oil or gas recovery operations due to the possibility of oxidation causing corrosion problems in downhole equipment. The typical specifications for carbon dioxide purity would be a maximum contaminants level of 3 mol % and, in the case of the use of carbon dioxide for enhanced oil recovery, the maximum oxygen content would be typically 100 ppm or lower, even as low as 1 ppm.

The current technology for the next stage of carbon dioxide purification uses a technique in which the contaminant gases are removed from the compressed dried pre-purified crude carbon dioxide stream at about 30 bar pressure by cooling the crude carbon dioxide to a temperature very close to the freezing point of carbon dioxide, where the carbon dioxide partial pressure is from about 7 bar to about 8 bar. The residual gas, containing about 25 mol % carbon dioxide, is separated and vented after heating and work expansion to produce power. This single process results in a carbon dioxide recovery of about 90%. The process of oxyfuel combustion would be considerably improved if very high carbon dioxide recoveries, e.g. above 97%, could be achieved economically.

The current technology for delivery of carbon dioxide from the oxyfuel combustion of fossil fuel to a geological storage site is based on compression to a pipeline pressure of typically about 100 bar to about 250 bar. An alternative technology for smaller sources of carbon dioxide emission, or where a pipeline might be too expensive, is to liquefy the carbon dioxide and transport the carbon dioxide at a pressure below its critical pressure as a liquid in, for example, a large seaborne tanker. The oxyfuel combustion process would be significantly improved if the carbon dioxide purification process could produce economically a liquid carbon dioxide product rather than a stream of supercritical carbon dioxide at near ambient temperature for pipeline delivery.

An important objective for carbon capture in an oxyfuel power system is to provide a method of treating compressed crude carbon dioxide to remove nitrogen and argon and to reduce the concentration of oxygen to less than 100 ppm, preferably with low consumption of energy and high recovery of carbon dioxide. Carbon dioxide recovery (based on carbon dioxide in the total flue gas stream) should ideally be better than 97%. In addition, if the purified carbon dioxide product is produced as a low temperature liquid stream at a pressure below its critical pressure, transportation as a liquid or as a supercritical fluid to a carbon dioxide storage site is facilitated.

A further method of carbon dioxide capture from fossil fuels is to convert the fossil fuel to a mixture of carbon monoxide and hydrogen called synthesis gas (or "syngas") by catalytic reforming with steam; by partial oxidation; by gas heated catalytic reforming; or by any combination of these known processes, followed by shift reaction of carbon monoxide and water to produce a net hydrogen-rich product gas containing carbon dioxide as the major impurity. These processes take place at high pressures, typically from about 20 bar to about 70 bar.

Hydrogen must be separated from impurities such as methane and carbon monoxide. Carbon monoxide must also be separated and purified. A preferred method of purification is to use a multi-bed pressure swing adsorption ("PSA") process to produce a pure hydrogen. A typical PSA unit, operating at 25 bar pressure, would have a typical recovery of about 85% to about 90% of hydrogen in the feed gas. The composition of the waste gas, typically at a pressure of about 1.2 bar to about 1.5 bar, depends on the method used to produce the gas from the fossil fuel. For example, the PSA waste gas from a feed produced in a steam/natural gas catalytic reformer would typically comprise at least about 60 mol % carbon dioxide, together with lower quantities of hydrogen, methane, carbon monoxide and water vapor. In this case, the objective would be to reduce the levels of carbon monoxide and methane to below 100 ppm.

FIG. 1 depicts a flow sheet for a prior art process for removal of contaminant gases from crude carbon dioxide produced in an oxyfuel combustion process. The process is disclosed in "*Carbon Dioxide Capture for Storage in Deep Geological Formations—Results from the $CO_2$ Capture Project*" (Capture and Separation of Carbon Dioxide from Combustion Sources; Vol. 1; Chapter 26; pp 451-475; Elsevier).

In FIG. 1, the carbon dioxide separation is carried out in a low temperature processing plant which uses carbon dioxide refrigeration to cool the crude carbon dioxide feed gas down to a temperature within about 2° C. of the carbon dioxide freezing temperature. At this point, a phase separation of the uncondensed gas takes place and the gas phase, containing about 25 mol % carbon dioxide and about 75 mol % contaminant gases is separated, warmed and work expanded to produce power before being vented to atmosphere.

The process separates the contaminant gases from the carbon dioxide at a temperature of −54.5° C. at a point close to the freezing temperature of the feed gas mixture, where the carbon dioxide vapor pressure is 7.4 bar. The refrigeration duty is provided by evaporating two streams of liquid carbon dioxide at pressure levels of 8.7 bar and 18.1 bar in heat exchangers E101 and E102. The two resultant carbon dioxide gas streams are fed to the carbon dioxide compressors, K101 and K102, which usually will be stages of a multistage compressor.

In FIG. 1, a feed 130 of carbonaceous fuel is combusted with a feed 132 of oxygen in an oxyfuel combustion unit R101 to produce a stream 134 of flue gas, the heat of which is used to generate steam in a power generation plant (not shown). Stream 134 is divided into a major part (stream 138) and a minor part (stream 136). Stream 138 is recycled to the oxyfuel combustion unit R101. Stream 136 of flue gas is washed with water in a gas-liquid contact vessel C105 to remove water soluble components and produce washed flue gas. A stream 142 of water is fed to the vessel C105 and a stream 144 of water comprising water soluble components from the flue gas is removed therefrom to provide a stream 146 of washed flue gas.

The stream 146 is compressed in a compressor K105 to produce a stream 1 of washed flue gas at a pressure of about 30 bar which is dried to a dewpoint of less than −60° C. in a pair of thermally regenerated desiccant driers C103 to produce a stream 2 of dried waste carbon dioxide gas. Stream 2 is cooled by indirect heat exchange in the heat exchanger E101 to about −23° C. to produce a stream 3 of crude gaseous carbon dioxide which is fed to a phase separation vessel C101 where it is separated to produce first carbon dioxide-enriched liquid and a first vapor containing the majority of the contaminant gases.

A stream 4 of first carbon dioxide-enriched liquid is reduced in pressure in valve V101 to about 18 bar to produce a stream 5 of reduced pressure first carbon dioxide-enriched liquid which is vaporized by indirect heat exchange in heat exchanger E101 to provide refrigeration and to produce a stream 6 of first carbon dioxide-enriched gas.

A stream 7 of first vapor from phase separator C101 is cooled by indirect heat exchange in the heat exchanger E102 to −54.5° C. to produce a stream 8 of partially condensed fluid which is fed to a second phase separation vessel C102 where it is separated into second carbon dioxide-enriched liquid and a second vapor, containing the majority of the remaining contaminant gases.

A stream 13 of second carbon dioxide-enriched liquid is warmed to a temperature of about −51° C. by indirect heat exchange in heat exchanger E102 to produce a stream 14 of warmed second carbon dioxide-enriched liquid which is reduced in pressure to 8.7 bar in valve V102 to produce a stream 15 of reduced pressure second carbon dioxide-enriched liquid. Stream 15 is vaporized and warmed by indirect heat exchange in the heat exchangers E101, E102 to provide refrigeration and produce a stream 16 of second carbon dioxide-enriched gas. The initial warming of stream 13 in heat exchanger E102 is critical to prevent freezing of the second carbon dioxide-enriched liquid on pressure reduction from about 30 bar.

A stream 9 of the second vapor from phase separator C102 is heated by indirect heat exchange to ambient temperature in the heat exchangers E101, E102 to produce a stream 10 of warmed second gas which is heated by indirect heat exchange in pre-heater E103 to about 300° C. to produce a stream 11 of pre-heated second gas. Stream 11 is work expanded in turbine K103 to produce power and a stream 12 of waste gas comprising about 25 mol % carbon dioxide and most of the contaminant gases which is then vented the atmosphere.

Stream 16 is compressed in the first stage K102 of a multi-stage centrifugal carbon dioxide compressor to produce a stream 17 of compressed carbon dioxide gas at a pressure of about 18 bar. Heat of compression is removed from stream 17 in an intercooler E104 using cooling water as the coolant. A stream 18 of cooled compressed carbon dioxide gas is combined with stream 6 and the combined stream is further compressed in the second or further stage(s) K101 of the compressor to produce a stream 19 of further compressed carbon dioxide gas at a pressure of about 110 bar. The concentration of carbon dioxide in stream 19 is about 96 mol %. Heat of compression is removed from stream 19 in an aftercooler E105 using boiler feed water and/or condensate as a coolant thereby heating the boiler feed water and/or condensate and producing a stream 20 of cooled further compressed carbon dioxide gas at pipeline pressure, e.g. at about 110 bar.

For simplicity, E101 and E102 are shown in FIG. 1 as separate heat exchangers. However, as would be appreciated by the skilled person, heat exchangers E101 and E102 would usually, in reality, form parts of the main heat exchanger with feed streams entering and product streams leaving at the most thermodynamically efficient locations. The main heat exchanger E101, E102 is usually a multi-stream plate-fin heat exchanger, preferably made from aluminum.

Table 1 is a heat and mass balance table for the process depicted in FIG. 1.

TABLE 1

| | | \multicolumn{10}{c}{Stream Number} | | | | | | | | | |
|---|---|---|---|---|---|---|---|---|---|---|---|
| | | 1 | 2 | 3 | 4 | 5 | 6 | 7 | 8 | 9 | 10 |
| Temperature | °C. | 24.83 | 24.83 | −22.66 | −22.66 | −30.87 | 11.21 | −22.66 | −54.50 | −54.50 | 11.21 |
| Pressure | bar a | 30 | 30 | 29.8 | 29.8 | 18.12636 | 18.02636 | 29.8 | 29.7 | 29.7 | 29.65 |
| Flow | kg/s | 140.49 | 140.40 | 140.40 | 27.73 | 27.73 | 27.73 | 112.67 | 112.67 | 37.75 | 37.75 |
| Composition | | | | | | | | | | | |
| $CO_2$ | mol % | 72.7633 | 72.8651 | 72.8651 | 97.6055 | 97.6055 | 97.6055 | 67.3695 | 67.3695 | 24.7546 | 24.7546 |
| $N_2$ | mol % | 18.9694 | 18.9959 | 18.9959 | 1.5014 | 1.5014 | 1.5014 | 22.8819 | 22.8819 | 53.4392 | 53.4392 |
| Ar | mol % | 2.6956 | 2.6994 | 2.6994 | 0.3712 | 0.3712 | 0.3712 | 3.2165 | 3.2165 | 6.9090 | 6.9090 |
| $O_2$ | mol % | 5.4316 | 5.4392 | 5.4392 | 0.5218 | 0.5218 | 0.5218 | 6.5314 | 6.5314 | 14.8960 | 14.8960 |
| $H_2O$ | mol % | 0.1396 | 0.0000 | 0.0000 | 0.0000 | 0.0000 | 0.0000 | 0.0000 | 0.0000 | 0.0000 | 0.0000 |
| $SO_2$ | ppm | 0.0000 | 0.0000 | 0.0000 | 0.0000 | 0.0000 | 0.0000 | 0.0000 | 0.0000 | 0.0000 | 0.0000 |
| NO | ppm | 4.9674 | 4.9743 | 4.9743 | 0.6929 | 0.6929 | 0.6929 | 5.9254 | 5.9254 | 12.0859 | 12.0859 |
| $NO_2$ | ppm | 0.0043 | 0.0043 | 0.0043 | 0.0210 | 0.0210 | 0.0210 | 0.0006 | 0.0006 | 0.0000 | 0.0000 |

| | | \multicolumn{10}{c}{Stream Number} | | | | | | | | | |
|---|---|---|---|---|---|---|---|---|---|---|---|
| | | 11 | 12 | 13 | 14 | 15 | 16 | 17 | 18 | 19 | 20 |
| Temperature | °C. | 300.00 | 20.07 | −54.50 | −42.85 | −55.50 | 11.21 | 69.17 | 25.00 | 195.10 | 43.00 |
| Pressure | bar a | 29.65 | 1.1 | 29.7 | 29.65 | 8.743321 | 8.543321 | 18.12636 | 18.02636 | 110 | 110 |
| Flow | kg/s | 37.75 | 37.75 | 74.92 | 74.92 | 74.92 | 74.92 | 74.92 | 74.92 | 102.65 | 102.65 |
| Composition | | | | | | | | | | | |
| $CO_2$ | mol % | 24.7546 | 24.7546 | 95.2747 | 95.2747 | 95.2747 | 95.2747 | 95.2747 | 95.2747 | 95.9012 | 95.9012 |
| $N_2$ | mol % | 53.4392 | 53.4392 | 2.8723 | 2.8723 | 2.8723 | 2.8723 | 2.8723 | 2.8723 | 2.5038 | 2.5038 |
| Ar | mol % | 6.9090 | 6.9090 | 0.7986 | 0.7986 | 0.7986 | 0.7986 | 0.7986 | 0.7986 | 0.6837 | 0.6837 |
| $O_2$ | mol % | 14.8960 | 14.8960 | 1.0542 | 1.0542 | 1.0542 | 1.0542 | 1.0542 | 1.0542 | 0.9111 | 0.9111 |
| $H_2O$ | mol % | 0.0000 | 0.0000 | 0.0000 | 0.0000 | 0.0000 | 0.0000 | 0.0000 | 0.0000 | 0.0000 | 0.0000 |
| $SO_2$ | ppm | 0.0000 | 0.0000 | 0.0000 | 0.0000 | 0.0000 | 0.0000 | 0.0000 | 0.0000 | 0.0000 | 0.0000 |
| NO | ppm | 12.0859 | 12.0859 | 1.8913 | 1.8913 | 1.8913 | 1.8913 | 1.8913 | 1.8913 | 1.5692 | 1.5692 |
| $NO_2$ | ppm | 0.0000 | 0.0000 | 0.0010 | 0.0010 | 0.0010 | 0.0010 | 0.0010 | 0.0010 | 0.0063 | 0.0063 |

The process depicted in FIG. 1 produces purified carbon dioxide having a carbon dioxide concentration of about 96 mol % and containing about 0.9 mol % oxygen at a carbon dioxide recovery of about 89%.

The general concept of using distillation to purify carbon dioxide produced in an oxyfuel combustion process is not new. In this connection, Allam et al ("*A Study of the Extraction of $CO_2$ from the Flue Gas of a 500 MW Pulverized Coal Fired Boiler*", Allam and Spilsbury; Energy Consers. Mgmt; Vol. 33; No. 5-8, pp 373-378; 1992) discloses a process for purifying carbon dioxide from an oxyfuel combustion process using distillation to purify the carbon dioxide to remove "heavy" impurities (such as sulfur dioxide and nitrogen dioxide), and contaminant gases including oxygen, nitrogen and argon.

In Allam et al, the carbon dioxide system is integrated with an air separation unit ("ASU"), using expansion of both the nitrogen and oxygen streams to provide refrigeration for the carbon dioxide liquefaction process. The process recycles part of the oxygen-containing stream separated from the carbon dioxide to the boiler, taking a purge stream at this point to prevent contaminants build up. A rectifying column is used at the cold end to remove lighter contaminants from the carbon dioxide stream. A second column, also at the cold end, removes sulfur dioxide and nitrogen oxides from the resultant carbon dioxide stream.

In addition, the general idea that a distillation column could be used to remove oxygen from carbon dioxide produced oxyfuel combustion process was disclosed by the Inventors in a paper entitled "*Purification of Oxyfuel-Derived $CO_2$ for Sequestration or EOR*" presented at the 8$^{th}$ Greenhouse Gas Control Technologies conference (GHGT-8), Trondheim, in June 2006. However, no details regarding how the general idea might be implemented were disclosed.

Other prior art includes GB-A-2151597 (Duckett; published 1985) which describes a process of using membranes to concentrate a low concentration carbon dioxide feed stream so that it can be purified using phase separation. The aim is to make liquid carbon dioxide for sale rather than to recover as much carbon dioxide as possible from a combustion process and, accordingly, carbon dioxide recovery from the feed is very low at about 70%.

GB-A-2151597 discloses the use of the carbon dioxide feed stream to provide heat to the reboiler of the distillation column. GB-A-2151597 also discloses the use of an external refrigeration source to provide the liquid required for the distillation process to work.

U.S. Pat. No. 4,602,477 (Lucadamo; published July 1986) discloses a process for taking hydrocarbon offgas and increasing its value by separating it into a light hydrocarbon stream, a heavy hydrocarbon stream, and a waste carbon dioxide stream. The presence of the carbon dioxide in the stream decreases the heating and economic value of the gas. The process uses a carbon dioxide membrane unit to perform a final removal of carbon dioxide from the light hydrocarbon product, in addition to a distillation step performed at low temperatures.

The aim of the process disclosed in U.S. Pat. No. 4,602,477 is not to produce high purity carbon dioxide but to remove carbon dioxide from the hydrocarbon feed. The distillation step produces the carbon dioxide stream as a side stream from a rectifying column having a condenser. The process also uses a stripping column to purify the heavy hydrocarbon stream.

U.S. Pat. No. 4,977,745 (Heichberger; published in December 1990) discloses a process for purifying a feed stream having a carbon dioxide feed purity of greater than 85 mol %. The high pressure residual stream is heated and expanded to recover power but an external refrigeration source is used to liquefy the carbon dioxide.

EP-A-0964215 (Novakand et al; published in December 1999) discloses the recovery of carbon dioxide from a process using carbon dioxide to freeze food. The process involves the use of a distillation column to recover the carbon dioxide. The carbon dioxide feed stream to the column provides reboiler duty to the column before being fed to the column as reflux.

U.S. Pat. No. 4,952,223 (Kirshnamurthy et al; published in August 1990) discloses a carbon dioxide liquefaction process in which the carbon dioxide recovery is improved by passing the vent gas to a PSA system to produce a carbon dioxide-enriched recycle stream and a carbon dioxide-depleted vent stream.

BRIEF SUMMARY OF THE INVENTION

According to a first aspect of the invention, there is provided a method for purifying impure carbon dioxide comprising a first contaminant selected from the group consisting of oxygen and carbon monoxide, said method comprising:
- compressing impure carbon dioxide gas to produce compressed impure carbon dioxide gas;
- condensing at least a portion of said compressed impure carbon dioxide gas to produce impure carbon dioxide liquid;
- expanding at least a portion of said impure carbon dioxide liquid to produce expanded impure carbon dioxide liquid; and
- separating at least a portion of said expanded impure carbon dioxide liquid in a mass transfer separation column system to produce first contaminant-enriched overhead vapor and carbon dioxide bottoms liquid.

According to a second aspect of the present invention, there is provided apparatus for purifying impure carbon dioxide comprising a first contaminant selected from the group consisting of oxygen and carbon monoxide, said apparatus comprising:
- a first compressor arrangement for compressing impure carbon dioxide gas to produce compressed impure carbon dioxide gas;
- a condenser arrangement for condensing compressed impure carbon dioxide gas to produce impure carbon dioxide liquid;
- a conduit arrangement for feeding compressed impure carbon dioxide gas from said first compressor arrangement to said condenser arrangement;
- a first pressure reduction arrangement for expanding impure carbon dioxide liquid to produce expanded impure carbon dioxide liquid;
- a conduit arrangement for feeding impure carbon dioxide liquid from said condenser arrangement to said first pressure reduction arrangement;
- a mass transfer separation column system for separating expanded impure carbon dioxide liquid to produce first contaminant-enriched overhead vapor and carbon dioxide bottoms liquid; and
- a conduit arrangement for feeding expanded impure carbon dioxide liquid from said first pressure reduction arrangement to said column system.

One advantage of preferred embodiments of the present invention is that the operating conditions of the mass transfer separation column system may be selected such that the carbon dioxide bottoms liquid may be removed directly as product from a column sump, ready for transportation by road, sea or pipeline without further pressure adjustment.

DETAILED DESCRIPTION OF THE INVENTION

Figure 1:
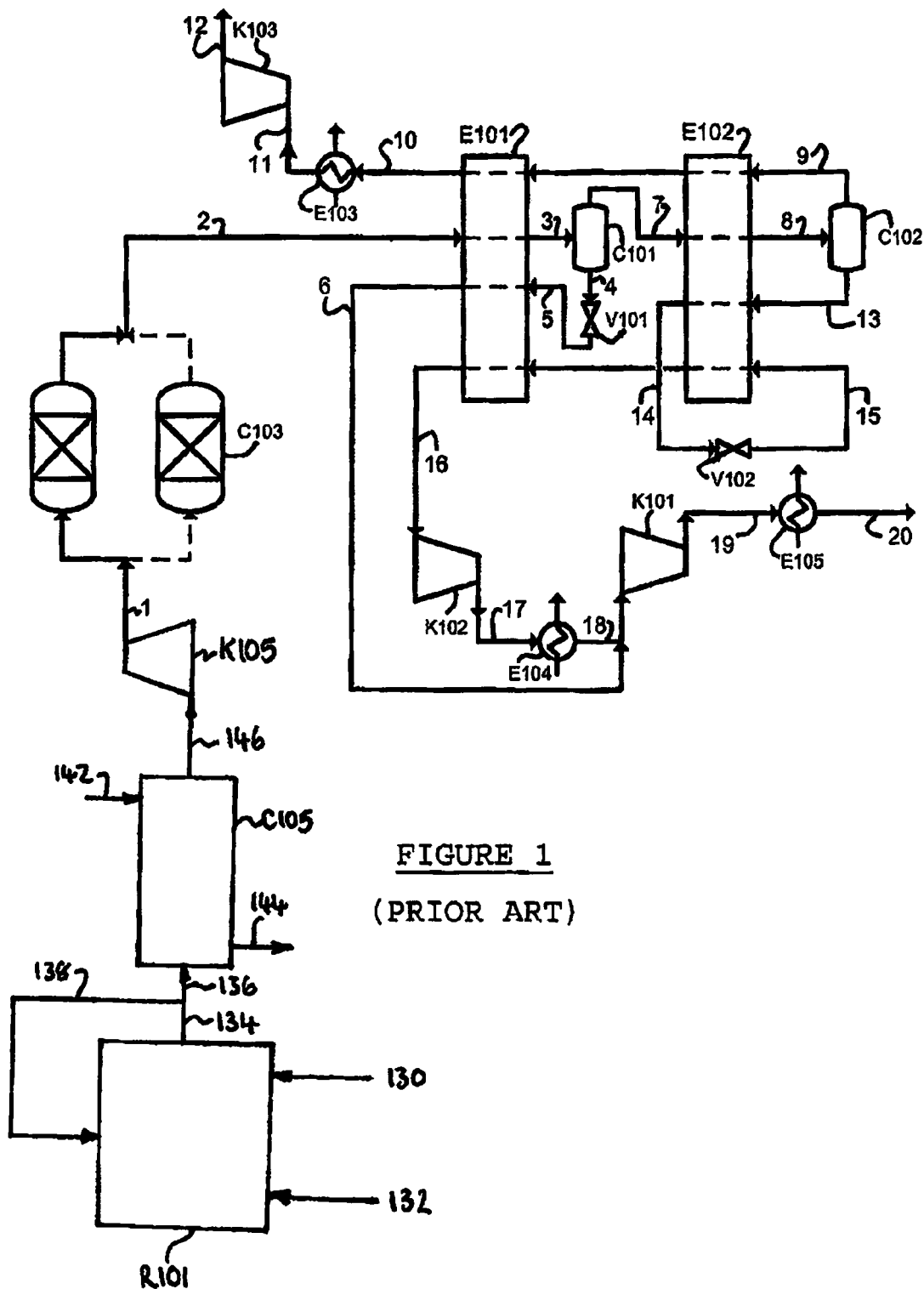
FIG. 1 is a schematic representation (flow sheet) of a prior art process for recovering carbon dioxide from waste carbon dioxide gas.

The method comprises compressing impure carbon dioxide gas to produce compressed impure carbon dioxide gas. At least a portion of the compressed impure carbon dioxide gas is condensed, usually by indirect heat exchange against a coolant such as water, to produce impure carbon dioxide liquid. At least a portion of the impure carbon dioxide liquid is expanded to produce expanded impure carbon dioxide liquid and at least a portion of the expanded impure carbon dioxide liquid is separated in a mass transfer separation column system to produce first contaminant-enriched overhead vapor and carbon dioxide bottoms liquid.

Other contaminants may be present in the impure liquid carbon dioxide. For example, if the method is used to recover carbon dioxide from flue gas produced in an oxyfuel combustion process, the other contaminants usually include oxygen, nitrogen and argon; oxides of sulfur (e.g. sulfur dioxide); and oxides of nitrogen (e.g. nitric oxide and nitrogen dioxide). If the method is used to recover carbon dioxide from off gas produced in a hydrogen PSA process, other contaminants usually include hydrogen; carbon monoxide; nitrogen; methane; and argon. The method of the present invention preferably also removes the bulk of these other contaminants from the impure liquid carbon dioxide.

The impure liquid carbon dioxide typically comprises at least about 90 mol %, and preferably about 95 mol % carbon dioxide.

The carbon dioxide bottoms liquid typically comprises at least about 99 mol %, preferably at least about 99.5 mol % carbon dioxide, and most preferably at least about 99.9 mol % carbon dioxide.

The pressure of the compressed impure carbon dioxide gas is usually from about 50 bar to about 90 bar, and preferably from about 65 bar to about 75 bar. In embodiments of the method that purify impure carbon dioxide derived from flue gas from an oxyfuel combustion process, the pressure of the compressed impure carbon dioxide may be from about 68 bar to about 71 bar. In embodiments of the method that purify impure carbon dioxide derived from waste gas from a hydrogen PSA process, the pressure of the compressed impure carbon dioxide may be a little lower, e.g. from about 66 bar to about 67 bar.

The temperature at which compressed carbon dioxide condenses is proportional to the pressure of the gas. Thus, as the pressure increases, so does the condensation temperature. One advantage of preferred embodiments of the present invention is that the pressure of the compressed impure carbon dioxide gas is relatively high and thus the condensation temperature is correspondingly high. In fact, at the preferred pressures, the compressed impure carbon dioxide gas may be condensed by indirect heat exchange against water as the coolant. This feature reduces the refrigeration duty required by the process and thus the overall power consumption may be reduced.

The operating pressure of the column system is usually from about the triple point pressure for carbon dioxide, i.e. from about 5.18 bar, to about 50 bar and, preferably, from about 25 bar to about 35 bar, e.g. about 30 bar.

The separation column system could be operated to produce carbon dioxide bottoms liquid at a pressure that is below the critical pressure of carbon dioxide which is about 73.9 bar. The liquid carbon dioxide product may then suitable to be taken directly from a sump in the column system and transported by road tanker or tanker ship. For a road tanker, the pressure of the carbon dioxide bottoms liquid produced in the column system is suitably from about 15 bar to about 30 bar and, for a tanker ship, the pressure is suitably from about 5 bar to about 10 bar. These embodiments provide an alternative to pipeline transportation of carbon dioxide at supercritical pressure.

In some embodiments, however, at least a portion of the carbon dioxide bottoms liquid may be pumped to produce pressurized carbon dioxide liquid, the pressure of which may be above the critical pressure for carbon dioxide. The pressurized carbon dioxide liquid may be at a pressure of from about 100 bar to about 250 bar. In such embodiments, at least a portion of the impure carbon dioxide gas may be precooled by indirect heat exchange against pressurized carbon dioxide liquid to produce precooled impure carbon dioxide gas for compression and warmed pressurized carbon dioxide liquid.

Carbon dioxide bottoms liquid is preferably reboiled by indirect heat exchange against crude carbon dioxide gas to produce carbon dioxide vapor for the column and cooled crude carbon dioxide gas. A portion of the crude carbon dioxide gas may condense during the reboiling of the column system. The pressure of the crude carbon dioxide gas may be from about 15 bar to about 60 bar, preferably from about 25 bar to about 35 bar, e.g. about 30 bar. In preferred embodiments, the operating pressure of said column system is about equal to the pressure of the crude carbon dioxide gas.

The crude carbon dioxide gas usually comprises at least about 60 mol % carbon dioxide, preferably from about 60 mol % to about 90 mol % carbon dioxide, for example, about 75 mol % carbon dioxide.

In preferred embodiments, the method comprises:
warming at least a portion of the first contaminant-enriched overhead vapor by indirect heat exchange, usually with at least one process stream, to produce first contaminant-enriched gas; and
combining at least a portion of the first contaminant-enriched gas with contaminated carbon dioxide gas feed to produce said crude carbon dioxide gas.

If the operating pressure of the column system is less than the pressure of the contaminated carbon dioxide gas feed, then the first contaminant-enriched gas should be compressed in a recycle compressor to the pressure of the contaminated carbon dioxide gas feed prior to recycling. However, in preferred embodiments, the column system is operated at a pressure that is higher than the pressure of the contaminated carbon dioxide gas feed by an amount about equal to the inherent pressure drop between the column system and the contaminated carbon dioxide gas feed. Such embodiments eliminate the need for a recycle compressor and, thus, have a lower overall power consumption.

In other embodiments, the first contaminant-enriched vapor may be recycled to the contaminated carbon dioxide gas feed at the isothermal location within a heat exchanger arrangement. In further embodiments, the first contaminant-enriched gas may be partially condensed independently from the contaminated carbon dioxide gas feed and fed separately to the or either phase separator.

The impure carbon dioxide gas is preferably derived from the crude carbon dioxide gas. In such embodiments, the method may comprise:
further cooling at least a portion of said cooled crude carbon dioxide gas by indirect heat exchange, usually with at least one process stream, to produce partially condensed crude carbon dioxide fluid;
phase separating at least a portion of said partially condensed crude carbon dioxide fluid to produce first impure liquid carbon dioxide and carbon dioxide-depleted vapor;
expanding at least a portion of said first impure liquid carbon dioxide to produce expanded first impure liquid carbon dioxide at a first pressure; and
vaporizing at least a portion of said expanded first impure liquid carbon dioxide by indirect heat exchange, usually with at least one process stream, to provide at least a portion of the refrigeration duty required by the method and first impure gaseous carbon dioxide. In such embodiments, the first impure gaseous carbon dioxide forms at least a portion of the impure carbon dioxide gas. The first pressure is usually from about 10 bar to about 25 bar, e.g. from about 17 to about 18 bar.

The method may also comprise:
cooling at least a portion of said carbon dioxide-depleted vapor by indirect heat exchange, usually with at least one process stream, to produce partially condensed carbon dioxide-depleted fluid;
phase separating at least a portion of said partially condensed carbon dioxide-depleted fluid to produce second impure liquid carbon dioxide and carbon dioxide-lean vapor;
expanding at least a portion of said second impure liquid carbon dioxide to produce expanded second impure liquid carbon dioxide at a second pressure which is lower than said first pressure; and
vaporizing at least a portion of said expanded second impure liquid carbon dioxide by indirect heat exchange, usually with at least one process stream, to provide a portion of the refrigeration duty required by the method and second impure gaseous carbon dioxide. The second pressure may be from about the triple point pressure for carbon dioxide to about 15 bar, from about 7 bar to about 8 bar.

Formation of solid carbon dioxide during expansion of the second impure liquid carbon dioxide may be prevented by warming the second impure liquid carbon dioxide by indirect heat exchange, usually with at least one process stream, prior to expansion.

The method may comprise:
compressing at least a portion of said second impure gaseous carbon dioxide to produce compressed second impure gaseous carbon dioxide at about said first pressure; and
combining at least a portion of said compressed second impure gaseous carbon dioxide with at least a portion of said first impure gaseous carbon dioxide or a gas derived therefrom to produce at least a portion of said impure carbon dioxide gas.

The carbon dioxide-lean vapor is usually warmed by indirect heat exchange, usually with at least one process stream, to ambient temperature to produce carbon dioxide-lean gas. At least a portion of the carbon dioxide-lean gas may be heated by indirect heat exchange and then work expanded to produce power and expanded carbon dioxide-lean gas which is usually vented to the atmosphere. Heat of compression from compression of the waste carbon dioxide gas may be used to heat the carbon dioxide-lean gas.

All of the inert gases or other contaminants are usually eventually vented in the expanded carbon dioxide-lean gas due to the recycle of the first contaminant-enriched gas.

As an alternative to pumping carbon dioxide bottoms liquid, the method may comprise:
  flashing at least a portion of said carbon dioxide bottoms liquid to produce carbon dioxide vapor and liquid carbon dioxide at a third pressure;
  warming at least a portion of said carbon dioxide vapor by indirect heat exchange, usually with at least one process stream, to provide carbon dioxide recycle gas;
  recycling at least a portion of said carbon dioxide recycle gas to form a portion of said impure carbon dioxide gas.

The term "flashing" is a term of art and refers to reducing the pressure of a fluid, usually across a valve, and feeding the reduced pressure fluid to a vessel in which liquid and vapor phases are separated.

The carbon dioxide bottoms liquid may be flashed to any pressure lower than the operating pressure of the column and above the triple point pressure for carbon dioxide, and is suitably flashed to a third pressure from about the triple point pressure of carbon dioxide to about 30 bar, usually from about 6 bar to about 10 bar, e.g. about 7 bar.

The third pressure is entirely independent of the first and second pressures and is preferably selected to optimize the efficiency of the process. For example, where the third pressure is equal to the first pressure, the carbon dioxide recycle gas may be combined with the first impure gaseous carbon dioxide without pressure adjustment to form the impure carbon dioxide gas thereby avoiding the power consumption of a recycle compressor.

Where the third pressure is equal to the second pressure, the carbon dioxide recycle gas may be combined with the second impure gaseous carbon dioxide without pressure adjustment. The combined carbon dioxide gas could then be compressed to the first pressure and combined with the first impure gaseous carbon dioxide to form the impure carbon dioxide gas.

Where the third pressure is different from the first pressure and the second pressure, the pressures of the various impure carbon dioxide gases must be suitably adjusted before combination to form the impure carbon dioxide gas. In this connection, the third pressure may be higher than the first (and second) pressure, in which case the first (and second) impure gaseous carbon dioxide would have to be compressed to the third pressure prior to combination with the carbon dioxide recycle gas to form the impure carbon dioxide gas.

The method may be applied to recover carbon dioxide from any stream of waste gas comprising at least about 60 mol % carbon dioxide. However, the method has particular application in the recovery of carbon dioxide from flue gas generated in an oxyfuel combustion process or waste gas from a hydrogen PSA process.

The first contaminant may be oxygen. In these embodiments, the impure carbon dioxide gas may be obtained from flue gas generated in an oxyfuel combustion process.

Flue gas is usually generated by combusting a fuel selected from the group consisting of carbonaceous fuel; hydrocarbonaceous fuel; and mixtures thereof, in the presence of pure oxygen in an oxyfuel combustion process. The flue gas is usually washed with water to remove at least the majority of water soluble contaminants and to cool the gas. The resultant washed flue gas is usually compressed to form compressed flue gas which is then usually dried.

The washing step usually takes place in a counter current gas-liquid contact vessel such as a wash (or scrub) column.

The washed flue gas is compressed to the operating pressure of the gas drying system. In embodiments in which the gas drying system is at least one desiccant drier, the operating pressure is usually about 10 bar to about 50 bar, and preferably from about 25 bar to about 35 bar, e.g. about 30 bar. Heat of compression may be recovered by preheating carbon dioxide-lean gas prior to expansion and venting.

Embodiments of the present method in which the first contaminant is oxygen may be incorporated into the method disclosed in the sister application, USSN (to be advised), identified by APCI Docket reference No. 07024A USA and filed on the same day as the present application, the disclosure of which is incorporated herein by reference. Thus, in embodiments in which the first contaminant is oxygen, the method may comprise:
  combusting a fuel selected from the group consisting of carbonaceous fuel; hydrocarbonaceous fuel; and mixtures thereof, in the presence of oxygen in an oxyfuel combustion unit to produce flue gas comprising carbon dioxide;
  warming at least a portion of the carbon dioxide-lean vapor by indirect heat exchange, usually with at least one process stream, to provide carbon dioxide-lean gas;
  separating carbon dioxide from at least a portion of said carbon dioxide-lean gas by diffusion across at least one permeable membrane in a membrane separation system to produce separated carbon dioxide gas and vent gas; and
  feeding at least a portion of the separated carbon dioxide gas from the membrane separation system to the oxyfuel combustion unit. The vent gas may be work expanded to produce power and then vented to the atmosphere.

The method disclosed in U.S. Ser. No. 11/287,640 (the disclosure of which has been incorporated herein by reference) may be integrated with the method of the present invention to remove at least a portion of one or more further contaminants selected from the group consisting of sulfur dioxide and $NO_x$ (i.e. nitric oxide and nitrogen dioxide) from the carbon dioxide gas in the flue gas compression train. In this connection, the method of the present invention may further comprise:
  compressing flue gas, or a gas derived therefrom, to an elevated pressure(s), usually from about 10 bar to about 50 bar;
  maintaining said flue gas at said elevated pressure in the presence of oxygen and water and, when sulfur dioxide is to be removed, $NO_x$, for a sufficient time to covert sulfur dioxide to sulfuric acid and/or $NO_x$ to nitric acid; and
  separating the sulfuric acid and/or nitric acid from the flue gas to produce sulfur dioxide-free, $NO_x$-lean carbon dioxide gas which is usually then fed to the gas drying system after further compression to the operating pressure thereof if necessary. One advantage of these embodiments is that any mercury present in the flue gas is also removed.

Where the crude carbon dioxide gas comprises $SO_2$ and $NO_x$, the method preferably comprises converting $SO_2$ to sulfuric acid at a first elevated pressure and converting $NO_x$ to nitric acid at a second elevated pressure which is higher than the first elevated pressure. A portion of the $NO_x$ may be converted to nitric acid at the first elevated pressure. For example, if $SO_2$ feed concentration is sufficiently low, there could be more nitric acid than sulfuric acid produced at the first elevated pressure.

In these embodiments, the method usually comprises:
washing flue gas or a gas derived therefrom with water at said first elevated pressure in a first counter current gas/liquid contact device to produce $SO_2$-free carbon dioxide gas and an aqueous sulfuric acid solution;
compressing at least a portion of the $SO_2$-free carbon dioxide gas to the second elevated pressure; and
washing at least a portion of the $SO_2$-free carbon dioxide gas with water at the second elevated pressure in a second counter current gas/liquid contact device to produce $SO_2$-free, $NO_x$-lean carbon dioxide gas and an aqueous nitric acid solution. At least a portion of the $SO_2$-free, $NO_x$-lean carbon dioxide gas is then fed, after optional further compression if necessary, to the gas drying system to produce contaminated carbon dioxide gas.

At least a portion of the aqueous sulfuric acid solution is usually recycled to the first gas/liquid contact device, optionally after pumping and/or cooling. At least a portion of the aqueous nitric acid solution is usually recycled to the second gas/liquid contact device, optionally after pumping and/or cooling.

The first elevated pressure is usually from 10 bar to 20 bar and is preferably about 15 bar. Where the flue gas is compressed to the first elevated pressure, such compression is preferably adiabatic. The second elevated pressure is usually from 25 bar to 35 bar and is preferably about 30 bar.

The first contaminant may be carbon monoxide. In these embodiments, the impure carbon dioxide gas may be obtained from waste gas from a hydrogen PSA process.

Carbonaceous fuel (e.g. coal) or hydrocarbonaceous fuel (e.g. methane or natural gas) may be converted to syngas by catalytic reforming with steam; partial oxidation; gas heated catalytic reforming; or any combination of these processes. Syngas may be subjected to shift reaction with water to produce hydrogen-enriched gas comprising carbon dioxide as a major component. These processes typically take place at a pressure from about 20 bar to about 70 bar.

Hydrogen may be separated from the hydrogen-enriched gas by a PSA system, usually a multi-bed PSA unit. A PSA system typically operates at about 25 bar. The composition of the waste gas stream from the PSA system depends on the fuel used but would usually comprise at least about 60 mol % carbon dioxide with lower quantities of hydrogen, methane, carbon monoxide and water.

Rather than venting the first contaminant-enriched gas (which, in these embodiments, contains substantial quantities of carbon monoxide, together with hydrogen, methane and carbon dioxide), the gas may be recycled to the syngas generation process.

At least the majority (i.e. over 50%), preferably at least 75% and more preferably at least 90%, of the entire refrigeration duty required by the method is preferably provided internally by indirect heat exchange between process streams.

Any remaining refrigeration duty not provided internally by vaporization of liquid process streams may be provided by vaporizing an external refrigerant. However, it is preferred that the entire refrigeration duty required by the method is provided internally, i.e. without the use of an external refrigerant, by indirect heat exchange between process streams.

The expression "refrigeration duty" refers only to the sub-ambient refrigeration duty, i.e. the refrigeration duty below ambient temperature, and excludes cooling duty at a temperature at or above ambient temperature.

In preferred embodiments, the impure liquid carbon dioxide is preferably fed to the column system at a location at or near the top of the or each column.

The apparatus comprises:
a first compressor arrangement for compressing impure carbon dioxide gas to produce compressed impure carbon dioxide gas;
a condenser arrangement for condensing compressed impure carbon dioxide gas to produce impure carbon dioxide liquid;
a conduit arrangement for feeding compressed impure carbon dioxide gas from said first compressor arrangement to said condenser arrangement;
a first pressure reduction arrangement for expanding impure carbon dioxide liquid to produce expanded impure carbon dioxide liquid;
a conduit arrangement for feeding impure carbon dioxide liquid from said condenser arrangement to said first pressure reduction arrangement;
a mass transfer separation column system for separating expanded impure carbon dioxide liquid to produce first contaminant-enriched overhead vapor and carbon dioxide bottoms liquid; and
a conduit arrangement for feeding expanded impure carbon dioxide liquid from said first pressure reduction arrangement to said column system.

An "arrangement" for carrying out a particular function is a device or devices adapted and constructed to carry out that function. For example, a "conduit arrangement" is any form of conduit suitable for transferring the relevant fluid between the indicated parts of the apparatus. A suitable example is a pipe or pipework. However, a conduit arrangement may comprise other features such as at least one fluid passage in a heat exchange arrangement or a compressor arrangement.

The "condenser arrangement" operates by cooling compressed impure carbon dioxide gas by indirect heat exchange against at least one coolant, such as water. An example of a suitable condenser arrangement is an aftercooler for the first compressor arrangement.

The "first compressor arrangement" is any form of compressor suitable for compressing carbon dioxide gas. A suitable example includes a single stage or multiple stage centrifugal compressor or at least one stage of a multiple stage centrifugal compressor with optional intercooling.

The "first pressure reduction arrangement" may be any suitable device for expanding pressurized liquid carbon dioxide. A suitable example includes a pressure reduction valve.

The mass transfer separation column system usually comprises at least one distillation (or stripping) column. In preferred embodiments, there is only one such column.

The apparatus usually comprises a heat exchanger for cooling at least a portion of the impure carbon dioxide liquid by indirect heat exchange, usually with at least one process stream, to produce cooled impure carbon dioxide liquid. In these embodiments, the conduit arrangement for feeding impure carbon dioxide liquid from the condenser arrangement to the first pressure reduction arrangement comprises:
a conduit arrangement for feeding impure carbon dioxide liquid from the condenser arrangement to the heat exchanger arrangement;
at least one fluid passage in the heat exchanger arrangement; and
a conduit arrangement for feeding cooled impure carbon dioxide liquid from the heat exchanger arrangement to the first pressure reduction arrangement.

The heat exchanger arrangement is usually a multi-stream plate fin heat exchanger having a plurality of fluid passages in which cooling stream(s) flow counter currently to warming stream(s). It is desirable that the feed streams enter and the product streams leave the main heat exchanger usually at the most thermodynamically efficient locations. The heat exchanger is usually made from aluminum.

In certain embodiments, the apparatus may comprise a conduit arrangement for distributing carbon dioxide bottoms liquid directly from the sump of the column system to, e.g. a road tanker or a tanker ship. In other embodiments, the apparatus may comprise:
   a pump arrangement for pumping carbon dioxide bottoms liquid to produce pressurized carbon dioxide liquid; and
   a conduit arrangement for feeding carbon dioxide bottoms liquid from the column system to the pump arrangement.
      The "pump arrangement" is usually a liquid pump.

In these embodiments, the apparatus usually comprises a conduit arrangement for feeding pressurized carbon dioxide liquid from the pump arrangement to a distribution pipeline. Such embodiments preferably comprise:
   a precooler for precooling impure carbon dioxide gas by indirect heat exchange against pressurized carbon dioxide liquid;
   a conduit arrangement for feeding pressurized carbon dioxide liquid from the pump arrangement to the precooler; and
   a conduit arrangement for feeding precooled impure carbon dioxide gas from the precooler to the first compressor arrangement.

The apparatus usually comprises a reboiler for reboiling carbon dioxide bottoms liquid by indirect heat exchanger against crude carbon dioxide gas to produce carbon dioxide vapor for the column and cooled crude carbon dioxide gas. The reboiler may be located either within the column system (e.g. in the sump of the column) or outside the column system as is known in the art. Suitable conduit arrangement(s) would be used for the reboiler depending on the location of the reboiler in relation to the column as is well known in the art.

The apparatus may comprise:
   a conduit arrangement for feeding first contaminant-enriched overheat vapor from the column system to the heat exchanger arrangement for warming to produce first contaminant-enriched gas; and
   a conduit arrangement for combining first contaminant-enriched gas from the heat exchanger arrangement with contaminated carbon dioxide gas to form crude carbon dioxide gas and for feeding at least a portion of the crude carbon dioxide gas to the reboiler.

The apparatus preferably comprises:
   a conduit arrangement for feeding cooled crude carbon dioxide gas from the reboiler to the heat exchanger arrangement for further cooling by indirect heat exchange to produce partially condensed crude carbon dioxide fluid;
   a phase separator for phase separating partially condensed crude carbon dioxide fluid into first impure liquid carbon dioxide and carbon dioxide-depleted vapor;
   a conduit arrangement for feeding partially condensed crude carbon dioxide fluid from the heat exchanger arrangement to the phase separator;
   a second pressure reduction arrangement for expanding first impure liquid carbon dioxide to produce expanded first impure liquid carbon dioxide at a first pressure;
   a conduit arrangement for feeding first impure liquid carbon dioxide from the phase separator to the second pressure reduction arrangement;
   a conduit arrangement for feeding expanded first impure liquid carbon dioxide from the second pressure reduction arrangement to the heat exchanger arrangement for vaporization to provide refrigeration for the method and first impure gaseous carbon dioxide; and
   a conduit arrangement for feeding first impure gaseous carbon dioxide from the heat exchanger arrangement to the first compressor arrangement.

The apparatus preferably also comprises:
   a conduit arrangement for feeding carbon dioxide-depleted vapor from the phase separator to the heat exchanger arrangement for cooling by indirect heat exchange to produce partially condensed carbon dioxide-depleted fluid;
   a further phase separator for phase separating partially condensed carbon dioxide-depleted fluid to produce second impure liquid carbon dioxide and carbon dioxide-lean vapor;
   a conduit arrangement for feeding partially condensed carbon dioxide-depleted fluid from the heat exchanger arrangement to the further phase separator;
   a third pressure reduction arrangement for expanding second impure liquid carbon dioxide to produce expanded second impure liquid carbon dioxide;
   a conduit arrangement for feeding second impure liquid carbon dioxide from the further phase separator to the third pressure reduction arrangement; and
   a conduit arrangement for feeding expanded second impure carbon dioxide to the heat exchanger arrangement for vaporization to provide refrigeration for the method and second impure gaseous carbon dioxide.

The "second compression arrangement" may be a single or multiple stage centrifugal compressor or one or more stages in a multiple stage centrifugal compressor with optional intercooling. In preferred embodiments, the first and second compression arrangements are stages within the same integrally geared machine.

In these embodiments, the conduit arrangement for feeding second impure liquid carbon dioxide from the further phase separator to the third pressure reduction arrangement may comprises:
   a conduit arrangement for feeding second impure liquid carbon dioxide from the further phase separator to the heat exchanger arrangement for warming to produce warmed second impure liquid carbon dioxide;
   at least one fluid passage within the heat exchanger arrangement; and
   a conduit arrangement for feeding warmed second impure liquid carbon dioxide from the heat exchanger arrangement to the third pressure reduction arrangement.

The apparatus may comprise:
   a second compressor arrangement for compressing second impure gaseous carbon dioxide to produce compressed second impure gaseous carbon dioxide;
   a conduit arrangement for feeding second impure gaseous carbon dioxide from the heat exchange arrangement to the second compressor arrangement; and
   a conduit arrangement for feeding compressed second impure gaseous carbon dioxide from the second compressor arrangement to the conduit arrangement for feeding first impure gaseous carbon dioxide to the first compressor arrangement.

In other preferred embodiments, the apparatus comprises:
   a flash vessel for flashing carbon dioxide bottoms liquid to produce carbon dioxide vapor and liquid carbon dioxide at a third pressure;
   a conduit arrangement for feeding carbon dioxide bottoms liquid from the column system to the flash vessel;

a conduit arrangement for feeding carbon dioxide vapor from the flash vessel to the heat exchanger arrangement for warming to produce carbon dioxide recycle gas; and a conduit arrangement for recycling carbon dioxide recycle gas as at least a portion of the impure carbon dioxide gas to the first compressor arrangement.

In such embodiments, the apparatus required would depend on the magnitude of the third pressure in relation to the first and second pressures. For example, where the third pressure is equal to the first pressure, the apparatus may further comprise a conduit arrangement to combine the carbon dioxide recycle gas with the first impure gaseous carbon dioxide and to feed the combined gas to the first compressor arrangement.

Where the third pressure is different from the first pressure, a further compressor arrangement, together with suitable a conduit arrangement(s), would be required before the relevant carbon dioxide gases could be combined and fed to the first compression arrangement. The further compression arrangement may be for the first (or second) impure gaseous carbon dioxide or for the carbon dioxide recycle gas depending on the relationship between the pressures.

Where the third pressure is less than the first pressure, one option would be for the conduit arrangement for recycling carbon dioxide recycle gas to comprise:

- a third compressor arrangement for compressing carbon dioxide recycle gas to produce compressed carbon dioxide recycle gas at the first pressure;
- a conduit arrangement for feeding carbon dioxide recycle gas from the heat exchanger arrangement to the third compressor arrangement; and
- a conduit arrangement for recycling compressed carbon dioxide recycle gas as at least a portion of the impure carbon dioxide gas to the first compressor arrangement.

The "third compressor arrangement" may be a single stage or multiple stage centrifugal compressor or may be one or more stages of a multiple stage centrifugal compressor with optional intercooling. In preferred embodiments, the first, second and third compression arrangements are stages of the same integrally geared machine.

In embodiments in which the waste carbon dioxide gas is derived from flue gas produced in an oxyfuel combustion process, the apparatus may comprise:

- an oxyfuel combustion unit for combusting a fuel selected from the group consisting of carbonaceous fuel; hydrocarbonaceous fuel; and mixtures thereof, in the presence of oxygen to produce flue gas comprising carbon dioxide;
- a gas-liquid contact vessel for washing at least a portion of the flue gas with water to remove water soluble components and produce washed flue gas;
- a conduit arrangement for feeding flue gas from the oxyfuel combustion unit to the gas-liquid contact vessel;
- a fourth compressor arrangement for compressing washed flue gas to produce compressed flue gas;
- a conduit arrangement for feeding washed flue gas from the gas-liquid contact vessel to the fourth compressor arrangement;
- a gas drying system for drying compressed flue gas to produce contaminated carbon dioxide gas;
- a conduit arrangement for feeding compressed flue gas from the fourth compressor arrangement to the gas drying system; and
- a conduit arrangement for feeding contaminated carbon dioxide gas, or a gas derived therefrom, to the reboiler.

The "fourth compressor arrangement" may be a single stage or multiple stage centrifugal compressor or is one or more stages of a multiple stage centrifugal compressor with optional intercooling. However, the fourth compression arrangement is preferably the combination of an axial compressor for the initial compression duty (e.g. for compression between about 1 bar to about 15 bar) and a centrifugal compressor for any remaining compression duty (e.g. from about 15 bar to about 30 bar).

The apparatus may comprise:

- an oxyfuel combustion unit for combusting a fuel selected from the group consisting of carbonaceous fuel; hydrocarbonaceous fuel; and mixtures thereof, in the presence of oxygen to produce flue gas comprising carbon dioxide;
- a conduit arrangement for feeding carbon dioxide-lean vapor to the heat exchanger arrangement for warming by indirect heat exchange to produce carbon dioxide-lean gas;
- a membrane separation system comprising at least one permeable membrane for separating carbon dioxide from carbon dioxide-lean gas to produce separated carbon dioxide gas and vent gas;
- a conduit arrangement for feeding carbon dioxide-lean gas from the heat exchanger arrangement to the membrane separation system; and
- a conduit arrangement for feeding separated carbon dioxide gas from the membrane separation unit to the oxyfuel combustion unit.

In embodiments including the removal of one or more contaminants selected from the group consisting of $SO_2$ and $NO_x$ from flue gas, the apparatus may comprise:

- at least one counter current gas/liquid contact device for washing flue gas or a gas derived therefrom, with water at elevated pressure in the presence of oxygen and, when $SO_2$ is to be removed, $NO_x$, for a sufficient time to convert $SO_2$ to sulfuric acid and/or $NO_x$ to nitric acid;
- a conduit arrangement for feeding flue gas at elevated pressure from the fourth compressor arrangement to the or each respective gas/liquid contact device; and
- a conduit arrangement(s) for recycling aqueous sulfuric acid solution and/or aqueous nitric acid solution to the or each respective gas/liquid contact device.

In embodiments where the fourth compressor arrangement is a multi-stage compressor, the apparatus may comprise:

- a first compression stage for compressing flue gas to a first elevated pressure;
- a conduit arrangement for feeding flue gas to the first compressor stage;
- a first counter current gas/liquid contact device for washing flue gas with water at the first elevated pressure for a sufficient time to produce $SO_2$-free carbon dioxide gas and an aqueous sulfuric acid solution;
- a conduit arrangement for feeding flue gas at the first elevated pressure from the first compression stage to the first gas/liquid contact device;
- a conduit arrangement for recycling aqueous sulfuric acid solution to the first gas/liquid contact column;
- a second compression stage for compressing $SO_2$-free carbon dioxide gas to a second elevated pressure which is higher than the first elevated pressure;
- a conduit arrangement for feeding $SO_2$-free carbon dioxide gas from the first counter current gas/liquid contact device to the second compression stage;
- a second counter current gas/liquid contact device for washing $SO_2$-free carbon dioxide gas with water at the second elevated pressure for a sufficient time to produce $SO_2$-free, $NO_x$-lean carbon dioxide gas and an aqueous nitric acid solution;

a conduit arrangement for feeding SO$_2$-free carbon dioxide gas at the second elevated pressure from the second compression stage to the second gas/liquid contact device;

a conduit arrangement for recycling aqueous nitric acid solution to the second gas/liquid contact device; and a conduit arrangement for feeding SO$_2$-free, NO$_x$-lean carbon dioxide gas from the second counter current gas/liquid contact device to the gas drying system.

The first and second compression stages may be stages of the same multi-stage, integrally geared, carbon dioxide compressor. However, in preferred embodiments, an axial compressor is used for compression to the first elevated pressure (e.g. about 15 bar) and at least one stage on an integrally geared machine is used for compression to the second elevated pressure (e.g. from about 15 bar to about 30 bar).

In embodiments for the purification of waste gas from a hydrogen PSA system, the apparatus may comprise:

a hydrogen PSA system for separating crude hydrogen gas comprising carbon dioxide and carbon monoxide to produce hydrogen gas and waste carbon dioxide gas comprising carbon monoxide;

a fifth compression arrangement for compressing waste carbon dioxide gas to produce compressed waste carbon dioxide gas;

a conduit arrangement for feeding waste carbon dioxide gas from the hydrogen PSA system to the fifth compression arrangement;

a gas dryer system for drying compressed waste carbon dioxide gas to produce contaminated carbon dioxide gas;

a conduit arrangement for feeding compressed waste carbon dioxide gas to the gas dryer system; and a conduit arrangement for feeding contaminated carbon dioxide gas, or a gas derived therefrom, the reboiler.

The "fifth compressor arrangement" may be a single or multiple stage centrifugal compressor.

The present invention will now be described by way of example only and with reference to FIGS. 2 and 3.

Figure 2:
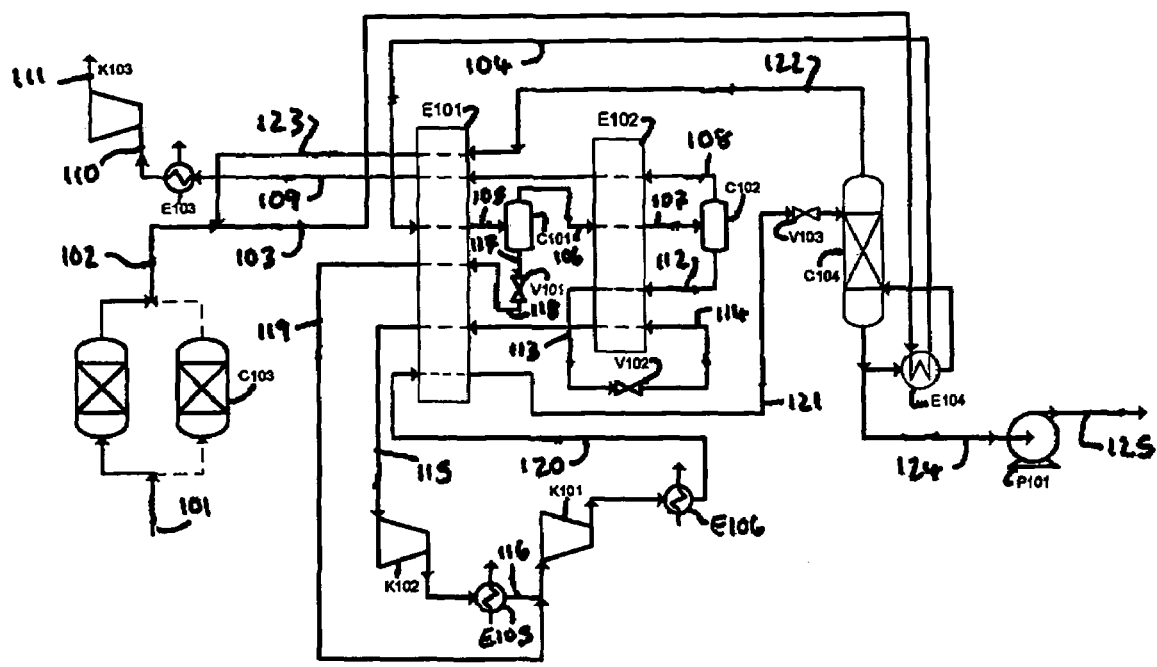
FIG. 2 is a schematic representation (flow sheet) of an embodiment of the present invention in which liquid carbon dioxide is pumped prior to distribution.
Figure 3:
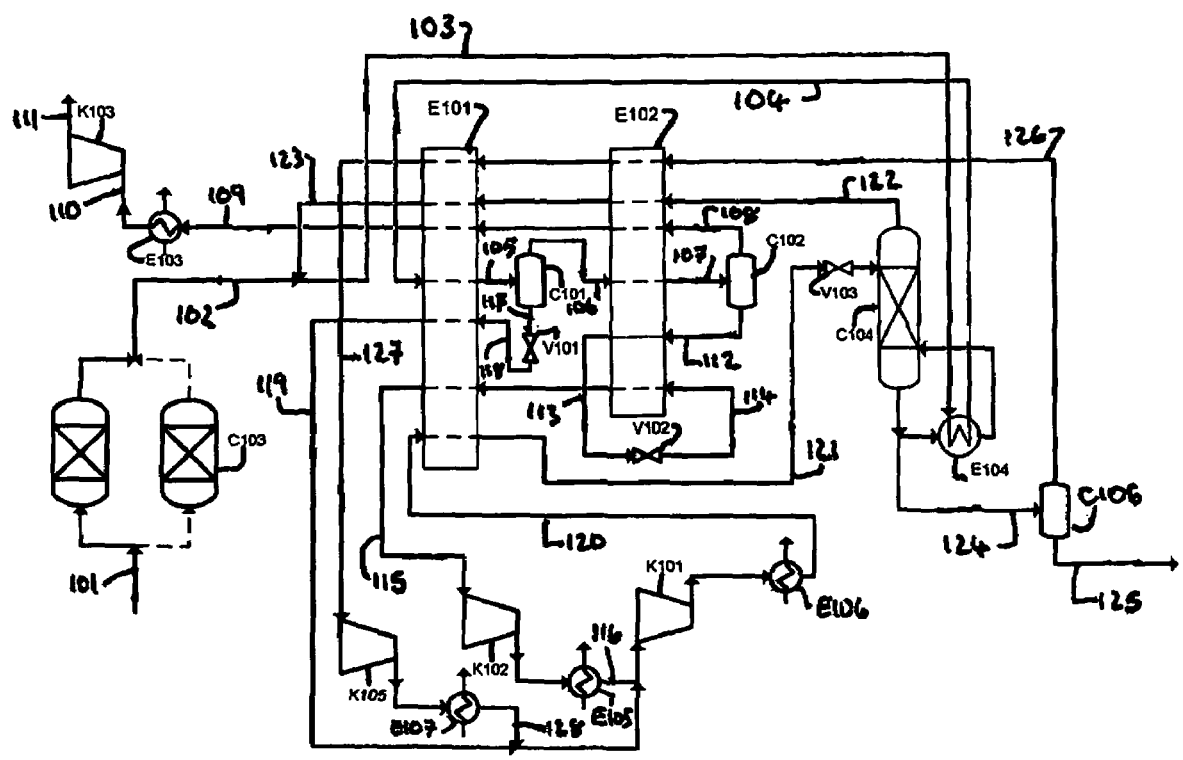
FIG. 3 is a schematic representation (flow sheet) of an embodiment of the present invention in which liquid carbon dioxide is flashed and the flashed carbon dioxide gas is recycled.

The processes depicted in FIGS. 2 and 3 can be used to purify flue gas from an oxyfuel combustion process (not shown) or waste gas from a hydrogen PSA system (not shown). For convenience, the following description is a discussion of the exemplified embodiments as applied to the purification of flue gas from an oxyfuel combustion process.

Referring to FIG. 2, flue gas from an oxyfuel combustion process (not shown) is washed in a wash column (not shown) to remove soluble contaminants and then compressed in a compressor (not shown) to produce a stream 101 of compressed flue gas, such as that of stream 1 of the prior art process in FIG. 1, at a pressure of about 30 bar and comprising about 73 mol % carbon dioxide. Stream 101 is fed to a pair of thermally regenerated desiccant driers C103 where it is dried to produce a stream 102 of contaminated carbon dioxide gas. Stream 102 is combined with a stream 123 of compressed oxygen-enriched gas recycled from downstream (see below) to form a stream 103 of crude carbon dioxide gas.

Stream 103 is used to reboil a mass transfer separation column C104 (see below) in reboiler E104 to produce vapor for the column C104 and a stream 104 of cooled crude carbon dioxide gas. Stream 104 is further cooled and partially condensed in the heat exchanger E101 to produce a stream 105 of partially condensed crude carbon dioxide fluid. Stream 105 is fed to a phase separator C101 where it is separated into a first impure liquid carbon dioxide and a carbon dioxide-depleted vapor.

A stream 117 of the first impure liquid carbon dioxide is expanded across a pressure reduction valve V101 to produce a stream 118 of expanded first impure liquid carbon dioxide at a pressure of about 17.9 bar. Stream 118 is vaporized by indirect heat exchange in the heat exchanger E101 to provide a portion of the refrigeration duty required by the process and a stream 119 of first impure gaseous carbon dioxide.

A stream 106 of carbon dioxide-depleted vapor is removed from the phase separator C101 and cooled and partially condensed by indirect heat exchange in the heat exchanger E102 to produce a stream 107 of partially condensed carbon dioxide-depleted fluid. Stream 107 is fed to a further phase separator C102 where it is separated to produce a second impure liquid carbon dioxide and a carbon dioxide-lean vapor.

A stream 108 of carbon dioxide-lean vapor is removed from the further phase separator C102 and warmed by indirect heat exchange in the heat exchanger E102, E101 to produce a stream 109 of carbon dioxide-lean gas at a temperature of about 19° C. Stream 109 is heated by indirect heat exchange in preheater E103 to about 300° C. to produce expanded stream 110 which is work expanded to about atmospheric pressure in turbine K103 to produce electrical power and a stream 111 of vent gas which is vented to the atmosphere.

A stream 112 of the second impure liquid carbon dioxide is warmed by indirect heat exchange in the heat exchanger E102 to produce a stream 113 of warmed second impure liquid carbon dioxide. Stream 113 is expanded across a pressure reduction valve V102 to produce a stream 114 of expanded second impure liquid carbon dioxide at a pressure of about 7.7 bar.

Stream 114 is vaporized by indirect heat exchange in the heat exchangers E102, E101 to provide a further portion of the refrigeration duty required by the process and a stream 115 of second impure gaseous carbon dioxide. Stream 115 is compressed in compressor K102 and a portion of the heat of compression is removed by indirect heat exchange in heat exchanger E105 to produce a stream 116 of compressed second impure gaseous carbon dioxide at a pressure of about 17.9 bar.

Stream 116 is combined with stream 119 to produce impure carbon dioxide gas which is compressed in compressor K101 to produce compressed impure carbon dioxide gas at a pressure of about 70.9 bar. Heat of compression is removed from said compressed impure carbon dioxide gas by indirect heat exchanger with a coolant, usually water, in aftercooler E106 thereby condensing the compressed impure carbon dioxide gas and producing a stream 120 of impure carbon dioxide liquid.

Stream 120 is sub-cooled by indirect heat exchange in the heat exchanger E101 to produce a stream 121 of impure carbon dioxide liquid. Stream 121 is expanded across a pressure reduction valve V103 to produce expanded impure carbon dioxide liquid at a pressure of about 30 bar which is fed to the top of the column C104 where it is separated into oxygen-enriched overhead vapor and carbon dioxide bottoms liquid. Column C104 is reboiled by vaporizing a portion of the carbon dioxide bottoms liquid by indirect heat exchange in reboiler E104 against the stream 103 of crude carbon dioxide gas.

A stream 122 of the oxygen-enriched overhead vapor is warmed by indirect heat exchange in the heat exchanger E101 to produce the stream 123 of warmed oxygen-enriched gas which is recycled to stream 102 of contaminated carbon dioxide gas to provide stream 103 of crude carbon dioxide gas.

In other (non-exemplified) embodiments, stream 122 could be recycled to other locations. For example, stream 122 could be recycled to stream 104 at the isothermal location within the heat exchanger E101. Further, stream 123 could be partially condensed independently from stream 104 in the heat exchanger E101 and then fed as a separate feed stream to the phase separator C101. Furthermore, stream 122 could be a partially condensed independently from streams 104 and 106 in the heat exchangers E101, E102 and then fed as a separate feed stream to the further phase separator C102.

A stream 124 of carbon dioxide-enriched bottoms liquid is removed from the column C104 and pumped in pump P101 to produce a stream 125 of pressurized carbon dioxide liquid at a pressure of about 110 bar which is suitable for transportation by pipeline.

The refrigeration and heat pump duty for the column C104 in FIG. 2 are provided by a two pressure level carbon dioxide recycle system which operates with a discharge pressure and two suction pressures determined by the 30 bar pressure of the crude carbon dioxide gas and purity and operating pressure level of the column C104 which is fixed by the required carbon dioxide liquid delivery pressure.

In the embodiment exemplified in FIG. 2, column C104 operates at a pressure of about 30 bar and the product carbon dioxide liquid is pressurized to above the critical pressure for carbon dioxide. However, one advantage of the present invention is that column C104 could be operated at different pressures to suit the required delivery pressure of the liquid carbon dioxide. For example, the column could be operated at a pressure from about 15 bar to about 30 bar to produce liquid carbon dioxide at a pressure suitable for transportation in a road tanker or at a pressure from about 5 bar to 10 bar to produce liquid carbon dioxide at a pressure suitable for transportation in a tanker ship without further pressure adjustment.

The embodiment depicted in FIG. 3 is similar to the embodiment depicted in FIG. 2. The same reference numerals have been used in FIG. 3 as in FIG. 2 to denote the common features between the two embodiments. The following is a discussion of only the additional features of the embodiment in FIG. 3.

A stream 124 of carbon dioxide-enriched bottoms liquid at a pressure of about 30 bar removed from column C104 is flashed in flash vessel C106 to produce carbon dioxide vapor and liquid carbon dioxide at a pressure of about 7 bar.

It should be noted that the carbon dioxide bottoms liquid may be flashed to any pressure below the operating pressure of the column and above the triple point pressure for carbon dioxide depending on the required delivery pressure of the liquid carbon dioxide for transportation.

A stream 125 of liquid carbon dioxide is removed for transportation or distribution. A stream 126 of carbon dioxide vapor is warmed by indirect heat exchange in the heat exchangers E102, E101 to produce a stream 127 of carbon dioxide gas. Stream 127 is compressed in compressor K105 to produce compressed carbon dioxide gas at a pressure of about 17.6 bar which, after removal of heat of compression by indirect heat exchange in heat exchanger E107 forming stream 128, is combined with stream 119 (which is also at a pressure of about 17.6 bar in the embodiment of FIG. 3) to produce impure gaseous carbon dioxide. The impure gaseous carbon dioxide is combined with stream 116 to produce the impure carbon dioxide gas.

Carbon dioxide compressors K101, K102 and K105 are provided by an integrally geared machine with multiple radial stages. K101 has three or four stages, optionally with intercooling between some stages although not within the last two stages because of the fact that the discharge pressure is above the critical pressure. K102 is one or two stages on the same machine with an intercooler and an aftercooler. K105 is further stages of the same integrally geared machine.

In the exemplified embodiments, some or all of the stages of the compressor K101, K102 and K105 are operated adiabatically and, thus, heat of compression is recoverable from the compressed carbon dioxide gas by indirect heat exchange with coolants using intercoolers E105, E107 and an aftercooler E106. The coolant in E105 and E107 is water. The coolant in E106 may be boiler feed water and/or condensate for the power generation plant thus heat of compression can be used to pre-heat these streams.

EXAMPLE 1

A computer simulation has been carried out using commercially available simulation software (Aspen Plus Version 2004.1) in which the process depicted in FIG. 2 is integrated with an oxyfuel combustion process in a power generation plant. A heat and mass balance table for the simulation is provided in Table 2.

The simulation achieved a carbon dioxide purity level of about 99.98 mol % with a carbon dioxide recovery of about 87.7%. The power consumption for this process is about 349.9 kWh/tonne (carbon dioxide captured) which is less than the power consumption (354.7 kWh/tonne) for the process in FIG. 1. These power figures include the power consumption of an associated air separation unit.

The carbon dioxide recovery can be increased to about 98% by using a membrane separation unit to recover carbon dioxide and oxygen from the carbon dioxide-lean gas in stream 109. The delivery temperature of supercritical carbon dioxide discharging from pump P101 is 0.7° C. This cold liquid carbon dioxide can be used to precool the combined carbon dioxide inlet to compressor K101 from 20° C. to 3° C. These additional features reduce the specific power consumption to about 333 kWh/tonne.

TABLE 2

| | | Stream Number | | | | | | | | | |
| --- | --- | --- | --- | --- | --- | --- | --- | --- | --- | --- | --- |
| | | 101 | 102 | 103 | 104 | 105 | 106 | 107 | 108 | 109 | 110 |
| Temperature | ° C. | 24.83 | 24.83 | 23.47 | 4.85 | −33.37 | −33.37 | −54.03 | −54.03 | 19.04 | 300.00 |
| Pressure | bar a | 30 | 30.00 | 30 | 30 | 30 | 30 | 30 | 30 | 30 | 30 |
| Flow | kg/s | 140.49 | 140.40 | 176.15 | 176.15 | 176.15 | 71.35 | 71.35 | 42.13 | 42.13 | 42.13 |
| Composition | | | | | | | | | | | |
| $CO_2$ | mol % | 72.7633 | 72.8651 | 75.7773 | 75.7773 | 75.7773 | 49.5248 | 49.5248 | 24.7718 | 24.7718 | 24.7718 |
| $N_2$ | mol % | 18.9694 | 18.9959 | 16.8833 | 16.8833 | 16.8833 | 35.3000 | 35.3000 | 52.6759 | 52.6759 | 52.6759 |
| Ar | mol % | 2.6956 | 2.6994 | 2.4407 | 2.4407 | 2.4407 | 5.0452 | 5.0452 | 7.4818 | 7.4818 | 7.4818 |
| $O_2$ | mol % | 5.4316 | 5.4392 | 4.8982 | 4.8982 | 4.8982 | 10.1291 | 10.1291 | 15.0691 | 15.0691 | 15.0691 |
| $H_2O$ | mol % | 0.1396 | 0.0000 | 0.0000 | 0.0000 | 0.0000 | 0.0000 | 0.0000 | 0.0000 | 0.0000 | 0.0000 |
| $SO_2$ | ppm | 0.0000 | 0.0000 | 0.0000 | 0.0000 | 0.0000 | 0.0000 | 0.0000 | 0.0000 | 0.0000 | 0.0000 |

TABLE 2-continued

| | | | | | | | | | | |
|---|---|---|---|---|---|---|---|---|---|---|
| NO | ppm | 4.9674 | 4.9744 | 4.8693 | 4.8693 | 4.8693 | 9.6224 | 9.6224 | 13.7306 | 13.7306 | 13.7306 |
| NO2 | ppm | 0.0000 | 0.0000 | 0.0000 | 0.0000 | 0.0000 | 0.0000 | 0.0000 | 0.0000 | 0.0000 | 0.0000 |

| | | Stream Number | | | | | | | | |
|---|---|---|---|---|---|---|---|---|---|---|
| | | 111 | 112 | 113 | 114 | 115 | 116 | 117 | 118 | 119 | 120 |
| Temperature | °C. | 62.04 | −54.03 | −37.35 | −55.03 | 19.04 | 20.00 | −33.37 | −38.09 | 19.04 | 20.00 |
| Pressure | bar a | 1.1 | 30 | 30 | 7.658185 | 7.658185 | 17.91999 | 30 | 17.91999 | 17.91999 | 70.86257 |
| Flow | kg/s | 42.13 | 29.22 | 29.22 | 29.22 | 29.22 | 29.22 | 104.80 | 104.80 | 104.80 | 134.02 |
| Composition | | | | | | | | | | | |
| CO2 | mol % | 24.7718 | 95.8492 | 95.8492 | 95.8492 | 95.8492 | 95.8492 | 96.8626 | 96.8626 | 96.8626 | 96.6411 |
| N2 | mol % | 52.6759 | 2.7815 | 2.7815 | 2.7815 | 2.7815 | 2.7815 | 2.0915 | 2.0915 | 2.0915 | 2.2423 |
| Ar | mol % | 7.4818 | 0.4850 | 0.4850 | 0.4850 | 0.4850 | 0.4850 | 0.3489 | 0.3489 | 0.3489 | 0.3787 |
| O2 | mol % | 15.0691 | 0.8840 | 0.8840 | 0.8840 | 0.8840 | 0.8840 | 0.6968 | 0.6968 | 0.6968 | 0.7377 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 13.7306 | 1.9341 | 1.9341 | 1.9341 | 1.9341 | 1.9341 | 1.0517 | 1.0517 | 1.0517 | 1.2446 |
| NO2 | ppm | 0.0000 | 0.0000 | 0.0000 | 0.0000 | 0.0000 | 0.0000 | 0.0000 | 0.0000 | 0.0000 | 0.0000 |

| | | Stream Number | | | | |
|---|---|---|---|---|---|---|
| | | 121 | 122 | 123 | 124 | 125 |
| Temperature | °C. | 6.89 | −11.66 | 19.04 | −5.66 | 0.74 |
| Pressure | bar a | 70.86257 | 30 | 30 | 30 | 110 |
| Flow | kg/s | 134.02 | 35.75 | 35.75 | 98.26 | 98.26 |
| Composition | | | | | | |
| CO2 | mol % | 96.6411 | 87.8167 | 87.8167 | 99.9791 | 99.9791 |
| N2 | mol % | 2.2423 | 8.1498 | 8.1498 | 0.0078 | 0.0078 |
| Ar | mol % | 0.3787 | 1.3715 | 1.3715 | 0.0031 | 0.0031 |
| O2 | mol % | 0.7377 | 2.6617 | 2.6617 | 0.0100 | 0.0100 |
| H2O | mol % | 0.0000 | 0.0000 | 0.0000 | 0.0000 | 0.0000 |
| SO2 | ppm | 0.0000 | 0.0000 | 0.0000 | 0.0000 | 0.0000 |
| NO | ppm | 1.2446 | 4.4349 | 4.4349 | 0.0378 | 0.0378 |
| NO2 | ppm | 0.0000 | 0.0000 | 0.0000 | 0.0000 | 0.0000 |

EXAMPLE 2

A computer simulation (Aspen Plus Version 2004.1) has been carried out in which the process depicted in FIG. 2 is integrated with a hydrogen PSA system (not shown). The off gas from the PSA system is compressed to 30 bar to form a stream 101 of compressed off gas which is fed to the process. A heat and mass balance table for the simulation is provided in Table 3.

The simulation indicates that the carbon monoxide level can be reduced to about 100 ppm.

TABLE 3

| | | Stream Number | | | | | | | | | |
|---|---|---|---|---|---|---|---|---|---|---|---|
| | | 101 | 102 | 103 | 104 | 105 | 106 | 107 | 108 | 109 | 110 |
| Temperature | °C. | 20.00 | 20.00 | 19.32 | 1.57 | −28.71 | −28.71 | −53.91 | −53.91 | 19.00 | 300.00 |
| Pressure | bar a | 30 | 30.00 | 30 | 30 | 30 | 30 | 30 | 30 | 30 | 30 |
| Flow | kg/s | 54.59 | 54.56 | 67.13 | 67.13 | 67.13 | 29.13 | 29.13 | 9.59 | 9.59 | 9.59 |
| Composition | | | | | | | | | | | |
| CO2 | mol % | 71.6071 | 71.6800 | 75.1427 | 75.1427 | 75.1427 | 55.4519 | 55.4519 | 23.1398 | 23.1398 | 23.1398 |
| N2 | mol % | 0.9951 | 0.9962 | 0.9120 | 0.9120 | 0.9120 | 1.5982 | 1.5982 | 2.7045 | 2.7045 | 2.7045 |
| Ar | mol % | 0.1683 | 0.1684 | 0.1564 | 0.1564 | 0.1564 | 0.2722 | 0.2722 | 0.4570 | 0.4570 | 0.4570 |
| H2 | mol % | 21.8625 | 21.8848 | 18.8500 | 18.8500 | 18.8500 | 34.1410 | 34.1410 | 59.4395 | 59.4395 | 59.4395 |
| H2O | mol % | 0.1017 | 0.0000 | 0.0000 | 0.0000 | 0.0000 | 0.0000 | 0.0000 | 0.0000 | 0.0000 | 0.0000 |
| CO | mol % | 4.5822 | 4.5869 | 4.2695 | 4.2695 | 4.2695 | 7.4157 | 7.4157 | 12.4409 | 12.4409 | 12.4409 |
| CH4 | mol % | 0.6831 | 0.6838 | 0.6694 | 0.6694 | 0.6694 | 1.1210 | 1.1210 | 1.8183 | 1.8183 | 1.8183 |

| | | Stream Number | | | | | | | | | |
|---|---|---|---|---|---|---|---|---|---|---|---|
| | | 111 | 112 | 113 | 114 | 115 | 116 | 117 | 118 | 119 | 120 |
| Temperature | °C. | 64.74 | −53.91 | −46.03 | −54.91 | 19.00 | 20.00 | −28.71 | −32.33 | 19.00 | 20.00 |
| Pressure | bar a | 1.1 | 30 | 30 | 7.106047 | 7.106047 | 17.44869 | 30 | 17.44869 | 17.44869 | 66.46532 |
| Flow | kg/s | 9.59 | 19.54 | 19.54 | 19.54 | 19.54 | 19.54 | 38.01 | 38.01 | 38.01 | 57.55 |
| Composition | | | | | | | | | | | |
| CO2 | mol % | 23.1398 | 98.3931 | 98.3931 | 98.3931 | 98.3931 | 98.3931 | 98.7526 | 98.7526 | 98.7526 | 98.6305 |
| N2 | mol % | 2.7045 | 0.1278 | 0.1278 | 0.1278 | 0.1278 | 0.1278 | 0.0893 | 0.0893 | 0.0893 | 0.1024 |
| Ar | mol % | 0.4570 | 0.0266 | 0.0266 | 0.0266 | 0.0266 | 0.0266 | 0.0176 | 0.0176 | 0.0176 | 0.0207 |
| H2 | mol % | 59.4395 | 0.5206 | 0.5206 | 0.5206 | 0.5206 | 0.5206 | 0.5155 | 0.5155 | 0.5155 | 0.5172 |

TABLE 3-continued

| | | | | | | | | | | | |
|---|---|---|---|---|---|---|---|---|---|---|---|
| H2O | mol % | 0.0000 | 0.0000 | 0.0000 | 0.0000 | 0.0000 | 0.0000 | 0.0000 | 0.0000 | 0.0000 | 0.0000 |
| CO | mol % | 12.4409 | 0.7375 | 0.7375 | 0.7375 | 0.7375 | 0.7375 | 0.4970 | 0.4970 | 0.4970 | 0.5788 |
| CH4 | mol % | 1.8183 | 0.1943 | 0.1943 | 0.1943 | 0.1943 | 0.1943 | 0.1278 | 0.1278 | 0.1278 | 0.1504 |

| | | Stream Number | | | | |
|---|---|---|---|---|---|---|
| | | 121 | 122 | 123 | 124 | 125 |
| Temperature | ° C. | 5.76 | −8.55 | 19.00 | −5.68 | 1.08 |
| Pressure | bar a | 66.46532 | 30 | 30 | 30 | 110 |
| Flow | kg/s | 57.55 | 12.58 | 12.58 | 44.97 | 44.97 |
| Composition | | | | | | |
| CO2 | mol % | 98.6305 | 94.0271 | 94.0271 | 99.9665 | 99.9665 |
| N2 | mol % | 0.1024 | 0.4532 | 0.4532 | 0.0006 | 0.0006 |
| Ar | mol % | 0.0207 | 0.0910 | 0.0910 | 0.0003 | 0.0003 |
| H2 | mol % | 0.5172 | 2.2994 | 2.2994 | 0.0000 | 0.0000 |
| H2O | mol % | 0.0000 | 0.0000 | 0.0000 | 0.0000 | 0.0000 |
| CO | mol % | 0.5788 | 2.5386 | 2.5386 | 0.0100 | 0.0100 |
| CH4 | mol % | 0.1504 | 0.5907 | 0.5907 | 0.0226 | 0.0226 |

EXAMPLE 3

A computer simulation (Aspen Plus Version 2004.1) has been carried out in which the process depicted in FIG. 3 is integrated with an oxyfuel combustion process in a power generation plant. A heat and mass balance table for the simulation is provided in Table 4.

This embodiment produces liquid carbon dioxide at a pressure of about 7 bar at a power consumption of about 361.8 kWh/tonne (carbon dioxide captured) which is surprisingly lower than the power consumption (about 375 kWh/tonne) for the production of liquid carbon dioxide from a mass transfer separation column operating at about 7 bar.

TABLE 4

| | | Stream Number | | | | | | | | | |
|---|---|---|---|---|---|---|---|---|---|---|---|
| | | 101 | 102 | 103 | 104 | 105 | 106 | 107 | 108 | 109 | 110 |
| Temperature | ° C. | 24.83 | 24.83 | 23.41 | −1.73 | −36.26 | −36.26 | −54.00 | −54.00 | 18.97 | 300.00 |
| Pressure | bar a | 30 | 30.00 | 30 | 30 | 30 | 30 | 30 | 30 | 30 | 30 |
| Flow | kg/s | 140.49 | 64.46 | 177.80 | 177.80 | 177.80 | 64.46 | 64.46 | 42.17 | 42.17 | 42.17 |
| Composition | | | | | | | | | | | |
| CO2 | mol % | 72.7633 | 72.8651 | 75.8776 | 75.8776 | 75.8776 | 45.3612 | 45.3612 | 24.7961 | 24.7961 | 24.7961 |
| N2 | mol % | 18.9694 | 18.9959 | 16.8069 | 16.8069 | 16.8069 | 38.2143 | 38.2143 | 52.6474 | 52.6474 | 52.6474 |
| Ar | mol % | 2.6956 | 2.6994 | 2.4327 | 2.4327 | 2.4327 | 5.4563 | 5.4563 | 7.4812 | 7.4812 | 7.4812 |
| O2 | mol % | 5.4316 | 5.4392 | 4.8824 | 4.8824 | 4.8824 | 10.9671 | 10.9671 | 15.0740 | 15.0740 | 15.0740 |
| H2O | mol % | 0.1396 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 4.9674 | 4.9744 | 4.8861 | 4.8861 | 4.8861 | 10.3527 | 10.3527 | 13.7793 | 13.7793 | 13.7793 |
| NO2 | ppm | 0.0000 | 0.0000 | 0.0000 | 0.0000 | 0.0000 | 0.0000 | 0.0000 | 0.0000 | 0.0000 | 0.0000 |

| | | Stream Number | | | | | | | | | |
|---|---|---|---|---|---|---|---|---|---|---|---|
| | | 111 | 112 | 113 | 114 | 115 | 116 | 117 | 118 | 119 | 120 |
| Temperature | ° C. | 62.06 | −54.00 | −31.35 | −55.00 | 18.97 | 20.00 | −36.26 | −40.47 | 18.97 | 20.00 |
| Pressure | bar a | 1.1 | 30 | 30 | 7.13 | 7.13 | 17.58 | 30.00 | 17.58 | 17.58 | 68.56 |
| Flow | kg/s | 42.17 | 22.29 | 22.29 | 22.29 | 22.29 | 22.29 | 113.34 | 113.34 | 113.34 | 172.78 |
| Composition | | | | | | | | | | | |
| CO2 | mol % | 24.7961 | 95.8500 | 95.8500 | 95.8500 | 95.8500 | 95.8500 | 96.6683 | 96.6683 | 96.6683 | 97.2570 |
| N2 | mol % | 52.6474 | 2.7804 | 2.7804 | 2.7804 | 2.7804 | 2.7804 | 2.2220 | 2.2220 | 2.2220 | 1.8264 |
| Ar | mol % | 7.4812 | 0.4850 | 0.4850 | 0.4850 | 0.4850 | 0.4850 | 0.3727 | 0.3727 | 0.3727 | 0.3101 |
| O2 | mol % | 15.0740 | 0.8845 | 0.8845 | 0.8845 | 0.8845 | 0.8845 | 0.7369 | 0.7369 | 0.7369 | 0.6064 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 13.7793 | 1.9402 | 1.9402 | 1.9402 | 1.9402 | 1.9402 | 1.1618 | 1.1618 | 1.1618 | 1.0424 |
| NO2 | ppm | 0.0000 | 0.0000 | 0.0000 | 0.0000 | 0.0000 | 0.0000 | 0.0000 | 0.0000 | 0.0000 | 0.0000 |

| | | Stream Number | | | | | | | |
|---|---|---|---|---|---|---|---|---|---|
| | | 121 | 122 | 123 | 124 | 125 | 126 | 127 | 128 |
| Temperature | ° C. | 2.10 | −11.67 | 18.97 | −5.66 | −49.40 | −49.40 | 18.97 | 20.00 |
| Pressure | bar a | 68.56 | 30 | 30 | 30 | 7 | 7 | 7 | 17.58 |
| Flow | kg/s | 172.78 | 37.40 | 37.40 | 135.38 | 98.23 | 37.15 | 37.15 | 37.15 |
| Composition | | | | | | | | | |
| CO2 | mol % | 97.2570 | 87.7810 | 87.7810 | 99.9791 | 99.9990 | 99.9266 | 99.9266 | 99.9266 |
| N2 | mol % | 1.8264 | 8.1574 | 8.1574 | 0.0077 | 0.0003 | 0.0273 | 0.0273 | 0.0273 |

TABLE 4-continued

| | | | | | | | | | |
|---|---|---|---|---|---|---|---|---|---|
| Ar | mol % | 0.3101 | 1.3787 | 1.3787 | 0.0031 | 0.0002 | 0.0110 | 0.0110 | 0.0110 |
| O2 | mol % | 0.6064 | 2.6825 | 2.6825 | 0.0100 | 0.0005 | 0.0351 | 0.0351 | 0.0351 |
| H2O | mol % | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 1.0000 | 2.0000 | 3.0000 |
| NO | ppm | 1.0424 | 4.5376 | 4.5376 | 0.0384 | 0.0042 | 0.1289 | 0.1289 | 0.1289 |
| NO2 | ppm | 0.0000 | 0.0000 | 0.0000 | 0.0000 | 0.0000 | 1.0000 | 2.0000 | 3.0000 |

Advantages of preferred embodiments of the present invention include:
- improving low temperature carbon dioxide purification;
- producing carbon dioxide at a purity of at least 97 mol %, and usually at least 99 mol %, e.g. 99.9 mol %;
- producing carbon dioxide with a very low level of oxygen or carbon monoxide, e.g. no more than 1000 ppm, typically no more than 100 ppm, and usually about 10 ppm (or even lower if required);
- producing carbon dioxide with very low levels of nitrogen and argon or other contaminants, typically a combined level of no more than 1000 ppm; and
- a reduction in overall power consumption compared with the prior art process of FIG. 1 (defined as kWh/tonne of carbon dioxide separated).

It will be appreciated that the invention is not restricted to the details described above with reference to the preferred embodiments but that numerous modifications and variations can be made without departing from the spirit and scope of the invention as defined in the following claims.

The invention claimed is:

1. A method for purifying impure carbon dioxide comprising a first contaminant selected from the group consisting of oxygen and carbon monoxide, said method comprising:
   compressing impure carbon dioxide gas to produce compressed impure carbon dioxide gas;
   condensing at least a portion of said compressed impure carbon dioxide gas to produce impure carbon dioxide liquid;
   expanding at least a portion of said impure carbon dioxide liquid to produce expanded impure carbon dioxide liquid; and
   separating at least a portion of said expanded impure carbon dioxide liquid in a mass transfer separation column system to produce first contaminant-enriched overhead vapor and carbon dioxide bottoms liquid,
wherein said carbon dioxide bottoms liquid is reboiled by indirect heat exchange against crude carbon dioxide gas to produce carbon dioxide vapor for the column and cooled crude carbon dioxide gas, and wherein said impure carbon dioxide gas is derived from said crude carbon dioxide gas.

2. The method according to claim 1 wherein the pressure of the compressed impure carbon dioxide gas is from about 50 bar to about 90 bar.

3. The method according to claim 1 wherein the operating pressure(s) of the column system is from about the triple point pressure for carbon dioxide to about 50 bar.

4. The method according to claim 1 wherein the carbon dioxide bottoms liquid is at a pressure lower than the critical pressure for carbon dioxide.

5. The method according to claim 1 comprising pumping at least a portion of said carbon dioxide bottoms liquid to produce pressurized carbon dioxide liquid.

6. The method according to claim 5 wherein the pressure of the pressurized carbon dioxide liquid is above the critical pressure for carbon dioxide.

7. The method according to claim 6 comprising precooling at least a portion of said impure carbon dioxide gas by indirect heat exchange against said pressurized carbon dioxide liquid to produce precooled impure carbon dioxide gas for compression and warmed pressurized carbon dioxide liquid.

8. The method according to claim 5 wherein the pressure of the pressurized carbon dioxide liquid is from about 100 bar to about 250 bar.

9. The method according to claim 1 wherein the pressure of the crude carbon dioxide gas is from about 15 bar to about 60 bar.

10. The method according to claim 1 wherein the operating pressure(s) of said column system is about equal to the pressure of said crude carbon dioxide gas.

11. The method according to claim 1 comprising:
   warming at least a portion of said first contaminant-enriched overhead vapor by indirect heat exchange to produce first contaminant-enriched gas;
   combining at least a portion of said first contaminant-enriched gas with a contaminated carbon dioxide gas feed to produce said crude carbon dioxide gas.

12. The method according to claim 11 wherein the operating pressure(s) of the column system is higher than the pressure of the contaminated carbon dioxide gas feed by an amount equal to the inherent pressure drop between the column system and said feed.

13. The method according to claim 1 comprising:
   further cooling at least a portion of said cooled crude carbon dioxide gas by indirect heat exchange to produce partially condensed crude carbon dioxide fluid;
   phase separating at least a portion of said partially condensed crude carbon dioxide fluid to produce first impure liquid carbon dioxide and carbon dioxide-depleted vapor;
   expanding at least a portion of said first impure liquid carbon dioxide to produce expanded first impure liquid carbon dioxide at a first pressure; and
   vaporizing at least a portion of said expanded first impure liquid carbon dioxide by indirect heat exchange to provide at least a portion of the refrigeration duty required by the method and first impure gaseous carbon dioxide, said first impure gaseous carbon dioxide forming at least a portion of said impure carbon dioxide gas.

14. The method according to claim 13 wherein said first pressure is from about 10 bar to about 25 bar.

15. The method according to claim 13 comprising:
   cooling at least a portion of said carbon dioxide-depleted vapor by indirect heat exchange to produce partially condensed carbon dioxide-depleted fluid;
   phase separating at least a portion of said partially condensed carbon dioxide-depleted fluid to produce second impure liquid carbon dioxide and carbon dioxide-lean vapor;
   expanding at least a portion of said second impure liquid carbon dioxide to produce expanded second impure liquid carbon dioxide at a second pressure which is lower than said first pressure; and vaporizing at least a portion of said expanded second impure liquid carbon dioxide by indirect heat exchange to provide a portion of the refrigeration duty required by the method and second impure gaseous carbon dioxide.

16. The method according to claim 15 wherein the second pressure is from about the triple point pressure for carbon dioxide to about 15 bar.

17. The method according to claim 15 wherein formation of solid carbon dioxide during expansion of said second impure liquid carbon dioxide is prevented by warming said second impure liquid carbon dioxide by indirect heat exchange prior to expansion.

18. The method according to claim 15 comprising:
compressing at least a portion of said second impure gaseous carbon dioxide to produce compressed second impure gaseous carbon dioxide at about said first pressure; and
combining at least a portion of said compressed second impure gaseous carbon dioxide with at least a portion of said first impure gaseous carbon dioxide or a gas derived therefrom to produce at least a portion of said impure carbon dioxide gas.

19. The method according to claim 1 comprising:
flashing at least a portion of said carbon dioxide bottoms liquid to produce carbon dioxide vapor and liquid carbon dioxide at a third pressure;
warming at least a portion of said carbon dioxide vapor by indirect heat exchange to provide carbon dioxide recycle gas;
recycling at least a portion of said carbon dioxide recycle gas to form a portion of said impure carbon dioxide gas.

20. The method according to claim 19 wherein the third pressure is from about the triple point pressure of carbon dioxide to about 30 bar.

21. The method according to claim 15, comprising:
flashing at least a portion of said carbon dioxide bottoms liquid to produce carbon dioxide vapor and liquid carbon dioxide at a third pressure;
warming at least a portion of said carbon dioxide vapor by indirect heat exchange to provide carbon dioxide recycle gas; and
recycling at least a portion of said carbon dioxide recycle gas to form a portion of said impure carbon dioxide qas, wherein the third pressure is about equal to the second pressure.

22. The method according to claim 1 wherein the entire refrigeration duty required by the method is provided internally by indirect heat exchange between process streams.

23. The method according to claim 1 wherein the first contaminant is oxygen.

24. The method according to claim 22 wherein said impure carbon dioxide gas is obtained from flue gas generated in an oxyfuel combustion process.

25. The method according to claim 1 wherein the first contaminant is carbon monoxide.

26. The method according to claim 25 wherein said impure carbon dioxide gas is obtained from waste gas produced from a hydrogen PSA process.

* * * * *